(12) United States Patent
Kraft

(10) Patent No.: US 7,958,115 B2
(45) Date of Patent: Jun. 7, 2011

(54) SEARCH SYSTEMS AND METHODS USING IN-LINE CONTEXTUAL QUERIES

(75) Inventor: Reiner Kraft, Gilroy, CA (US)

(73) Assignee: Yahoo! Inc., Sunnyvale, CA (US)

( * ) Notice: Subject to any disclaimer, the term of this patent is extended or adjusted under 35 U.S.C. 154(b) by 376 days.

(21) Appl. No.: 10/903,283

(22) Filed: Jul. 29, 2004

(65) Prior Publication Data

US 2006/0026013 A1    Feb. 2, 2006

(51) Int. Cl.
  *G06F 7/00* (2006.01)
  *G06F 17/30* (2006.01)

(52) U.S. Cl. .................. 707/723; 707/706; 707/710

(58) Field of Classification Search .............. 707/3, 706, 707/710, 722, 723
  See application file for complete search history.

(56) References Cited

U.S. PATENT DOCUMENTS

| | | | |
|---|---|---|---|
| 5,619,709 A * | 4/1997 | Caid et al. ................ 715/209 |
| 5,771,378 A * | 6/1998 | Holt et al. ................ 707/5 |
| 5,835,087 A * | 11/1998 | Herz et al. ................ 715/810 |
| 6,134,532 A * | 10/2000 | Lazarus et al. ........... 705/14 |
| 6,169,992 B1 | 1/2001 | Beall et al. |
| 6,327,590 B1 * | 12/2001 | Chidlovskii et al. .......... 707/5 |
| 6,345,289 B1 | 2/2002 | Lotspiech et al. |
| 6,446,065 B1 | 9/2002 | Nishioka et al. |
| 6,490,579 B1 | 12/2002 | Gao et al. |
| 6,605,120 B1 | 8/2003 | Fields et al. |
| 6,633,868 B1 * | 10/2003 | Min et al. ................ 707/3 |
| 6,701,311 B2 * | 3/2004 | Biebesheimer et al. ...... 707/5 |
| 6,785,670 B1 | 8/2004 | Chiang et al. |
| 6,785,671 B1 | 8/2004 | Bailey et al. |
| 6,789,073 B1 * | 9/2004 | Lunenfeld ................ 707/3 |
| 6,816,857 B1 | 11/2004 | Weissman et al. |
| 6,853,998 B2 | 2/2005 | Biebesheimer et al. |
| 6,859,807 B1 | 2/2005 | Knight et al. |
| 6,961,731 B2 | 11/2005 | Holbrook |
| 7,028,024 B1 | 4/2006 | Kommers et al. |
| 7,058,626 B1 * | 6/2006 | Pan et al. ................ 707/4 |
| 7,243,095 B2 | 7/2007 | Chang et al. |

(Continued)

FOREIGN PATENT DOCUMENTS

WO    WO 01/11504    2/2001

OTHER PUBLICATIONS

Budzik, J., Hammond, K. J., Marlow, C., and Scheinkman, A., "Anticipating Information Needs: Everyday Applications as Interfaces to Internet Information Resources," in Proceedings of The 1998 World Conference of the WWW, Internet and Intranet, (Orlando, FL), AACE Press, 1998.*

(Continued)

*Primary Examiner* — Apu M Mofiz
*Assistant Examiner* — Jared M Bibbee
(74) *Attorney, Agent, or Firm* — Hickman Palermo Truong & Becker LLP

(57) ABSTRACT

Systems and methods are provided for implementing searches using contextual information associated with a Web page (or other document) that a user is viewing when a query is entered. The page includes a contextual search interface that has an associated context vector representing content of the page. When the user submits a search query via the contextual search interface, the query and the context vector are both provided to the query processor and used in responding to the query.

66 Claims, 10 Drawing Sheets

U.S. PATENT DOCUMENTS

| | | | |
|---|---|---|---|
| 7,409,402 | B1 | 8/2008 | Chan et al. |
| 7,421,426 | B2 | 9/2008 | Berstis et al. |
| 7,702,677 | B2 | 4/2010 | Chang et al. |
| 2001/0037205 | A1 | 11/2001 | Joao |
| 2002/0004735 | A1 | 1/2002 | Gross |
| 2002/0072997 | A1 | 6/2002 | Colson et al. |
| 2002/0078029 | A1 | 6/2002 | Pachet |
| 2002/0081020 | A1 | 6/2002 | Shimazu |
| 2002/0092019 | A1 | 7/2002 | Marcus |
| 2002/0103798 | A1 | 8/2002 | Abrol et al. |
| 2002/0105532 | A1 | 8/2002 | Oblinger |
| 2002/0124263 | A1 | 9/2002 | Yokomizo |
| 2002/0152222 | A1 | 10/2002 | Holbrook |
| 2003/0061200 | A1 | 3/2003 | Hubert et al. |
| 2003/0074369 | A1 | 4/2003 | Schuetze et al. |
| 2003/0097357 | A1 | 5/2003 | Ferrari et al. |
| 2003/0135582 | A1 | 7/2003 | Lee et al. |
| 2003/0177059 | A1 | 9/2003 | Smorenburg et al. |
| 2003/0204530 | A1 | 10/2003 | Anderson et al. |
| 2003/0229893 | A1 | 12/2003 | Sgaraglino |
| 2003/0233224 | A1 | 12/2003 | Marchisio et al. |
| 2004/0002959 | A1* | 1/2004 | Alpert et al. ................ 707/3 |
| 2004/0100510 | A1 | 5/2004 | Milic-Frayling et al. |
| 2004/0117358 | A1 | 6/2004 | Von Kaenel et al. |
| 2004/0133471 | A1 | 7/2004 | Pisaris-Henderson et al. |
| 2004/0193520 | A1* | 9/2004 | LaComb et al. .............. 705/35 |
| 2004/0199496 | A1 | 10/2004 | Liu et al. |
| 2004/0210468 | A1 | 10/2004 | Rubel et al. |
| 2005/0060311 | A1 | 3/2005 | Tong et al. |
| 2005/0080780 | A1 | 4/2005 | Colledge et al. |
| 2005/0102177 | A1 | 5/2005 | Takayama |
| 2005/0125354 | A1 | 6/2005 | Pisaris-Henderson et al. |
| 2005/0131894 | A1 | 6/2005 | Vuong |
| 2005/0149496 | A1 | 7/2005 | Mukherjee et al. |
| 2005/0160080 | A1 | 7/2005 | Dawson |
| 2005/0257045 | A1 | 11/2005 | Bushman et al. |
| 2006/0026013 | A1 | 2/2006 | Kraft |
| 2006/0036490 | A1 | 2/2006 | Sagalyn |
| 2006/0036570 | A1 | 2/2006 | Schaefer et al. |
| 2006/0069610 | A1 | 3/2006 | Rossini |
| 2006/0074726 | A1 | 4/2006 | Forbes et al. |
| 2006/0074853 | A1* | 4/2006 | Liu et al. ................ 707/1 |
| 2006/0074876 | A1 | 4/2006 | Kakivaya et al. |
| 2006/0116926 | A1 | 6/2006 | Chen |
| 2006/0149710 | A1 | 7/2006 | Koningstein et al. |
| 2006/0242018 | A1 | 10/2006 | Shulman et al. |
| 2007/0106657 | A1 | 5/2007 | Brzeski et al. |
| 2007/0168346 | A1 | 7/2007 | Markanthony et al. |
| 2007/0260448 | A1 | 11/2007 | Lorenzen et al. |
| 2009/0112857 | A1 | 4/2009 | Tong et al. |
| 2009/0125544 | A1 | 5/2009 | Brindley |
| 2009/0265338 | A1 | 10/2009 | Kraft et al. |
| 2010/0070484 | A1 | 3/2010 | Kraft et al. |
| 2010/0083105 | A1 | 4/2010 | Channabasavaiah |

OTHER PUBLICATIONS

Budzik, J., and Hammond, K. J., "User interactions with Everyday Applications as Context for Just-in-time Information Access," in Proceedings of The 2000 International Conference on Intelligent User Interfaces, (New Orleans, Louisiana, USA Jan 9-12, 2000), ACM Press, 2000.*

Budzik, J., Hammond, K., and Birnbaum, L., "Information Access in Context," Knowledge Based Systems, 14(1-2), 37-53, Sep. 30, 2001.*

Budzik, J., Bradshaw, S., Fu, X., and Hammond, K. J., "Supporting on-line resource discovery in the context of ongoing tasks with proactive software assistants," International Journal of Human-Computer Studies, 56, 47-74, Jan. 2002.*

Budzik, J., and Hammond, K. (1999). Watson: Anticipating and Contextualizing Information Needs. In Proceedings of the Sixty-Second Annual Meeting of the American Society for Information Science (Oct. 31, Nov. 4, 1999). Learned Information, Inc., Medford, N J, 1999.*

Almieda et al. A Community-Aware Search Engine Department of Computer Science, WWW2004, May 17-22, 2004.

Bharat SearchPad: explicit capture of search context to support Web search, Proceedings 9th International World Wide Web Conference May 15-19, 2000.

Budzik et al. User Interactions with Everyday Applications as Context for Just-in-time Information Access, Proceedings of the 2000 International Conference on Intelligent User Interfaces, 2000.

Finkelstein et al. Placing Search in Context: The Concept Revisited, WWW10, May 2-5, 2001.

Freyne et al. Further Experiments on Collaborative Ranking in Community-Based Web Search, Artificial Intelligence Review 2004.

Lieberman, Henry Letizia: An agent that assists web browsing, Proceedings of the Fourteenth International Joint Conference on Artificial Intelligence Aug. 20-25, 1995.

Mitre et al. Improving Automatic Query Expansion Proceedings of AMC SIGIR, ACM Press 1998.

Rhodes et al. Rememberance Agent: A continuously running automated information retrieval system Proceedings of the First International Conference on the Practical Application of Intelligent Agents and Multi Agent Technology (PAAM 1996) pp. 487-495.

Bharat, Krishna, "SearchPad: Explicit Capture of Search Context to Support Web Search", Compaq, Systems Research Center, retrieved from website <http://www9.org/w9cdrom/173/173.html>, printed on Apr. 12, 2007, 13 pages.

Current Claims for International Application No. PCT/US05/26184, pp. 1-8.

ISA/US Patent Cooperation Treaty, PCT "Notification of Transmittal of the International Search Report and the Written Opinion of the International Searching Authority, or the Declaration", PCT/US05/26184 dated Jul. 31, 2007, pp. 1-9.

Zhao, Hongkun, et al., "Fullyautomatic wrapper generation for search engines", International World Wide Web Conference, Proceedings of the 14th International conference on World wide web, ACM 2005, 10 pages.

Gibbins, Nicholas, et al., "Agent-based semantic web services", International World wide web conference, Proceedings of the 12th International conference World wide web, ACM 2003, 8 pages.

Budzik et al., "User Interactions with Everyday Applications as Context for Just-in-time Information Access", ACM Press, 2000, 8 pages.

Sugiyama, Kazunari et al., "Adaptive Web search based on user profile constructed without any effort from users", XP-002434325, International World Wide Web Conference, XX, XX, May 2004, 10 pages.

European Patent Office, "Supplementary European Search Report", application No. EP 05774749, dated Mar. 31, 2009, 7 pages.

Claims, application No. EP 05774749, 9 pages.

D1: Finkelstein, L. et al., "Placing Search in Context: The Concept Revisited" 2002 ACM (18 pages).

D2: Sugiyama, K. et al., "Adaptive Web Search Based on User Profile Constructed without Any Effort from Users" WWW2004, May 17-22, 2004 (12 pages).

Chinese Office Action received in application serial No. 200680037856.X dated Sep. 7, 2010 (8 pages).

Current Claims of Chinese application serial No. 200680037856.X, Dec. 2010 (5 pages).

Chinese Office Action received in Application serial No. 200580032112.4 dated Oct. 28, 2010 (27 pages).

Current Claims in Application serial No. 200580032112.4, Dec. 2010 (5 pages).

Maglio, P et al., "LiveInfo: Adapting web experience by customization and annotation". In Proceedings of the 1st International Conference on Adaptive Hypermedia and Adaptive Web-based Systems, AH2000, Trento, Italy, Aug. 2000 (10 pages).

Dumais et al., "Optimizing Search by Showing Results in Context," Mar. 31, 2001, ACM, pp. 1-8.

* cited by examiner

| | | | | |
|---|---|---|---|---|
| 402 | 404 | 406 | 408 | 410 |
| cabrio | 11 | 1 | 0.0153846153846 | TEXT |
| golf | 6 | 1 | 0.0153846153846 | TEXT |
| vw | 3 | 1 | 0.0153846153846 | TEXT |
| like | 2 | 1 | 0.0153846153846 | TEXT |
| followed | 2 | 1 | 0.0153846153846 | TEXT |
| production | 2 | 1 | 0.0153846153846 | TEXT |
| 1 | 2 | 1 | 0.0153846153846 | TEXT |
| now | 2 | 1 | 0.0153846153846 | TEXT |
| scirocco | 2 | 1 | 0.0153846153846 | TEXT |
| type | 2 | 1 | 0.0153846153846 | TEXT |

600

Entertainment

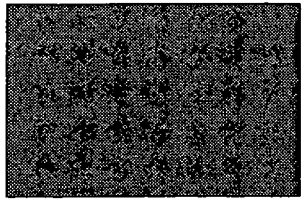

Bono Denies Plans for a 'Live Aid 2' Concert
Reuters -Tue Jun 1, 10:16 AM ET
Irish rock star Bono played down rumors on Tuesday that he and his friends in the music industry are planning a second Live Aid concert to raise money to fight AIDS.
} 602

 Search This
612

Sports

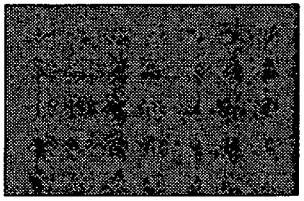

Williams Sisters Lose at French Open
AP - 37 minutes ago
Venus Williams again came up short in a bid for her first Grand Slam title since 2001, losing to Anastasia Myskina 6-3, 6-4 Tuesday in the Roland Garros quarterfinals..
} 604

Search This
614

Technology

PluggedIn: Sun Powers Gadgets on Peaks, in Valleys
Reuters - 50 minutes ago
Gadget lovers are using solar panels to power their toys in the remotest places — like Mt. Everest, altitude 29,029 feet.
} 606

Search This
616

FIG. 6

SEARCH SYSTEMS AND METHODS USING IN-LINE CONTEXTUAL QUERIES

BACKGROUND OF THE INVENTION

The present invention relates in general to search systems and methods and in particular to search systems and methods using in-line contextual queries.

The World Wide Web (Web), as its name suggests, is a decentralized global collection of interlinked information—generally in the form of "pages" that may contain text, images, and/or media content—related to virtually every topic imaginable. A user who knows or finds a uniform resource locator (URL) for a page can provide that URL to a Web client (generally referred to as a browser) and view the page almost instantly. Since Web pages typically include links (also referred to as "hyperlinks") to other pages, finding URLs is generally not difficult.

What is difficult for most users is finding URLs for pages that are of interest to them. The sheer volume of content available on the Web has turned the task of finding a page relevant to a particular interest into what may be the ultimate needle-in-a-haystack problem. To address this problem, an industry of search providers (e.g., Yahoo!, MSN, Google) has evolved. A search provider typically maintains a database of Web pages in which the URL of each page is associated with information (e.g., keywords, category data, etc.) reflecting its content. The search provider also maintains a search server that hosts a search page (or site) on the Web. The search page provides a form into which a user can enter a query that usually includes one or more terms indicative of the user's interest. Once a query is entered, the search server accesses the database and generates a list of "hits," typically URLs for pages whose content matches keywords derived from the user's query. This list is provided to the user. Since queries can often return hundreds, thousands, or in some cases millions of hits, search providers have developed sophisticated algorithms for ranking the hits (i.e., determining an order for displaying hits to the user) such that the pages most relevant to a given query are likely to appear near the top of the list. Typical ranking algorithms take into account not only the keywords and their frequency of occurrence but also other information such as the number of other pages that link to the hit page, popularity of the hit page among users, and so on.

To further facilitate use of their services, some search providers now offer "search toolbar" add-ons for Web browser programs. A search toolbar typically provides a text box into which the user can type a query and a "Submit" button for submitting the query to the search provider's server. Once installed by the user, the search toolbar is generally visible no matter what page the user is viewing, enabling the user to enter a query at any time without first navigating to the search provider's Web site. Searches initiated via the toolbar are processed in the same way as searches initiated at the provider's site; the only difference is that the user is spared the step of navigating to the search provider's site.

While automated search technologies can be very helpful, they do have a number of limitations, a primary one being that users struggle to convey enough contextual information to direct the search to relevant content. An overly broad query (too little context) can return a few needles of relevant content buried in a haystack of irrelevant hits; an overly narrow query (too much context) may result in filtering out the needles along with the hay. Often a user has a fairly specific context in mind, but this specific context may not be reflected in a query. For example, a user who enters the query "jaguar" might be thinking of the automobile, the animal, the professional football team, or something else entirely.

In principle, contextual information might be gleaned from what the user was doing prior to entering the query. It is well known that users are often inspired to conduct searches when information they are currently reviewing raises a further question. For example, a user who enters the query "jaguar" after (or while) viewing an automobile-related page is most likely interested in the automobile while one who enters the same query after (or while) viewing a page about zoos is most likely interested in the animal. Existing search technologies do not provide reliable ways of gathering such contextual information or using it to respond to a query.

Therefore, it would be desirable to provide a search server with contextual information that is usable for responding to queries.

BRIEF SUMMARY OF THE INVENTION

Embodiments of the present invention provide systems and methods for implementing searches using contextual information associated with a page or other document that a user is viewing when a query is entered. In some embodiments, the page or document includes a contextual search interface that has an associated context vector representing content of the page or document. When the user submits a search query via the contextual search interface, the context vector is also provided to the query processor and used in responding to the query. Context vectors may also be used in other ways, such as selecting additional content that may be of interest to a user.

According to one aspect of the present invention, a method for processing a query is provided. A user query is received via a contextual search interface, with the user query including data entered by a user. A context vector associated with the contextual search interface is also received, with the context vector including data representative of content associated with the contextual search interface. A search corpus is searched using the search query and the context vector to obtain a search result including a list of hits. The search result are transmitted for presentation to the user.

According to another aspect of the invention, a method is provided for providing information to a user. A page containing content is provided. A contextual search interface is associated with the content, with the contextual search interface being adapted to accept a query from a user. A context vector representing the content is associated with the contextual search interface. A query is received from the user via the contextual search interface, and the query and the context vector are transmitted to a search server for processing, where the search server is configured to search a search corpus using the query and the context vector and to return results of the search to the user. In some embodiments, an inactive state and an active state are defined for the contextual search interface, with the contextual search interface appearing on the page as a small icon when in the inactive state and as a complete interface when in the active state. For example, the contextual search interface may be displayed in the inactive state by default and redisplayed in the active state in response to user selection of the icon. In some embodiments, in response to user selection of the icon, special content may be added to the page, with the special content being selected based on the context vector.

The following detailed description together with the accompanying drawings will provide a better understanding of the nature and advantages of the present invention.

BRIEF DESCRIPTION OF THE DRAWINGS

FIG. 6 is an illustration of a Web page with multiple contextual search interfaces according to an embodiment of the present invention.

DETAILED DESCRIPTION OF THE INVENTION

I. Overview

A. Network Implementation

Figure 1:
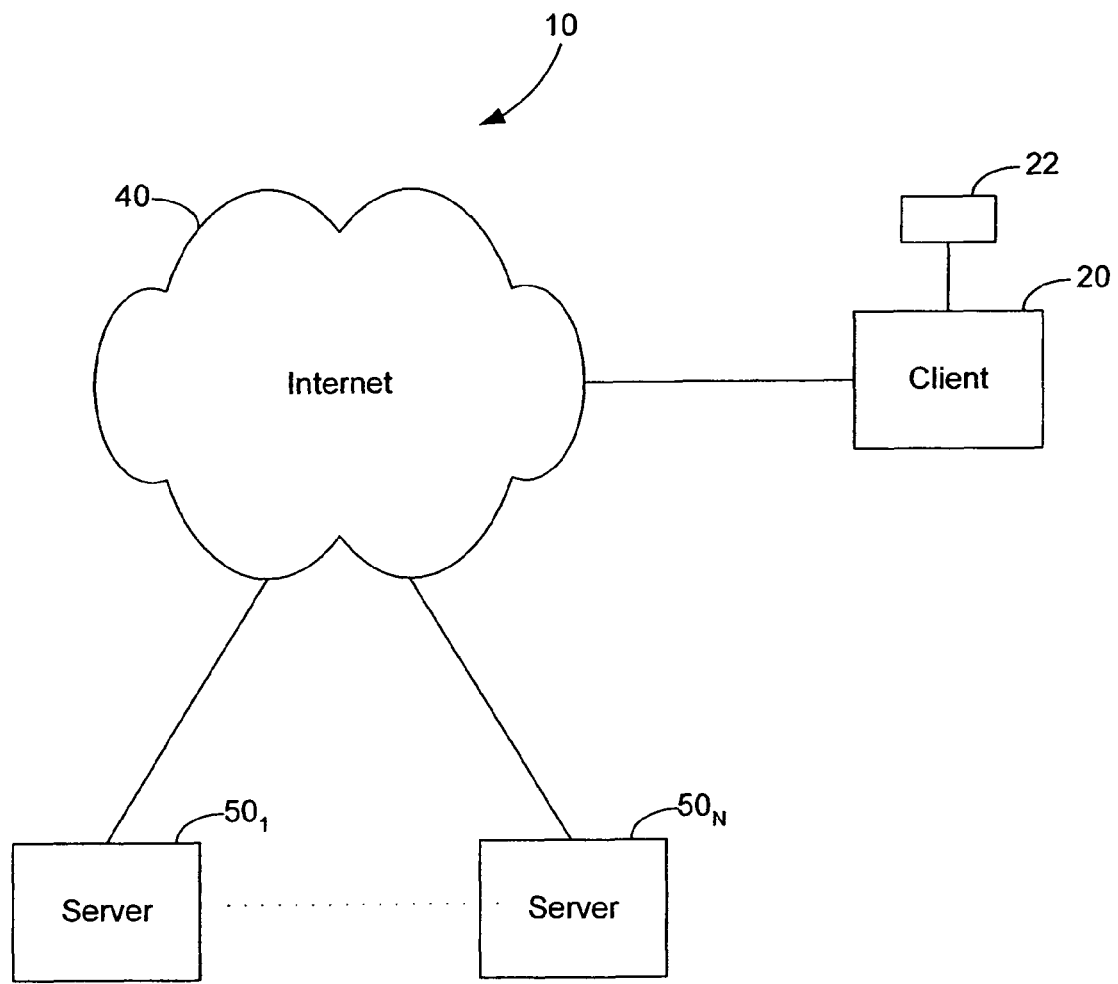
FIG. 1 is a high-level block diagram of an information retrieval and communication network including a client system according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems 50₁ to 50N. As will be described herein, client system 20 is configured according to the present invention to communicate with any of server systems 50₁ to 50N, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems 50₁ to 50N over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems 50₁ to 50N or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems 50₁ to 50N to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

B. Search System

Figure 2:
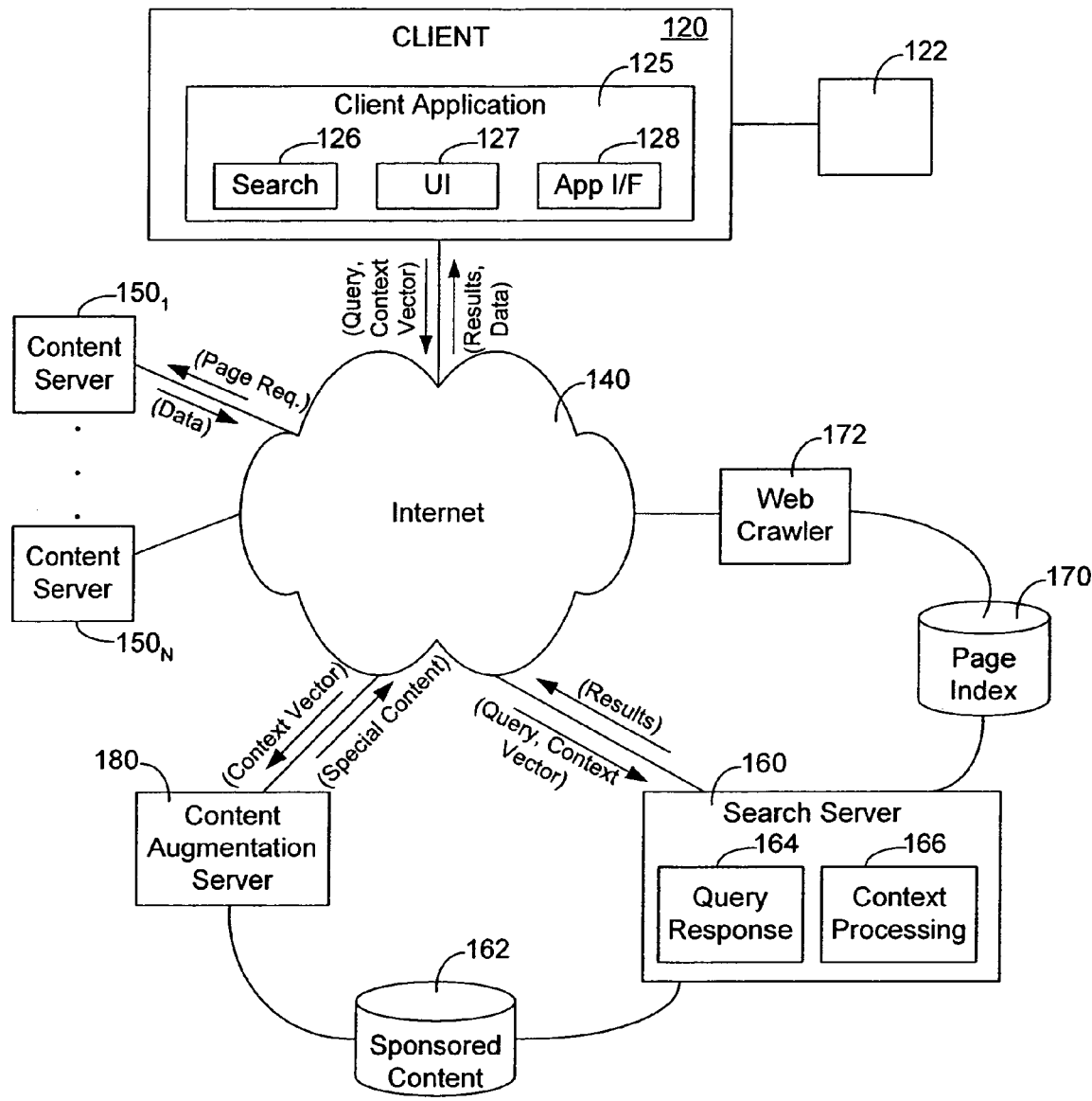
FIG. 2 is a block diagram of another information retrieval and communication network according to an embodiment of the invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As discussed above, client system 120 and its components are configured to communicate with server systems 150 and 160 and other server systems over Internet 140 or other communication networks.

1. Client System

According to one embodiment, a client application (represented as module 125) executing on client system 120 includes instructions for controlling client system 120 and its components to communicate with server systems 150 and 160 and to process and display data content received therefrom. Client application 125 may be transmitted and downloaded to client system 120 from a software source such as a remote server system (e.g., server systems 150, server system 160 or other remote server system), or client application module 125 may also be provided on any software storage medium (floppy disk, CD, DVD, etc.) that is readable by client system 120 as discussed above. For example, in one aspect, client application 125 may be provided over Internet 140 to client system 120 in an HTML wrapper including various controls such as, for example, embedded JavaScript or Active X controls, for manipulating data and rendering data in various objects, frames and windows.

Client application module 125 advantageously includes various software modules for processing data and media content. In one embodiment, these modules include a specialized search module 126, a user interface module 127, and an application interface module 128. Specialized search module 126 is configured for processing search requests (also referred to herein as queries) to be sent to search server 160 and search result data received from search server 160. Specific aspects of specialized search module 126 are described below.

User interface module 127 is configured for rendering data and media content in text and data frames and active windows, e.g., browser windows and dialog boxes. In some embodiments, user interface module 127 includes or communicates with a browser program, which may be a default browser configured on client system 120 or a different browser. Application interface module 128 is configured to support interfacing and communicating between client application 125 and various other applications executing on client 120, such as e-mail applications, instant messaging (IM) applications, browser applications, document management applications and others.

User interface module 127 advantageously provides user input interfaces allowing the user to enter queries for processing by search server system 160. For example, where user interface module 127 includes or communicates with a browser, the user may be able to enter a URL or activate a control button to direct the browser to a Web search page (or site) from which the user can submit a query to search server system 160 for processing. In addition or instead, user interface module 127 may include a search toolbar or other interface via which the user can enter and submit a query without first navigating to the search page. Queries entered using user interface module 127 may be preprocessed by specialized search module 126 prior to being sent to search server system 160, e.g., to remove so-called "stop words" ("the," "and," etc.), to correct spelling errors, or the like.

In accordance with an embodiment of the present invention, client application 125 may include various features for adding context data (referred to herein as a "context vector") to the user's queries. For example, specialized search module 126 may be configured to generate context vectors based on content the user is currently viewing at the time a query is entered. As another example, in some embodiments of the present invention, Web pages displayed in the browser may include one or more context vectors that can be used to supplement user-entered queries. User interface module 127 may be configured to detect such contextual vectors in a page being displayed and use context vector data to supplement a query entered by the user. These and other features are described further below.

2. Search Server System

According to one embodiment of the invention, search server system 160 is configured to provide search result data and media content to client system 120, and content server system 150 is configured to provide data and media content such as web pages to client system 120, for example, in response to links selected by the user in search result pages provided by search server system 160. In some variations, search server system 160 returns content as well as, or instead of, links and/or other references to content.

Search server system 160 references various page indexes 170 that are populated with, e.g., pages, links to pages, data representing the content of indexed pages, etc. Page indexes may be generated by various collection technologies such as an automatic web crawler 172; in addition, manual or semi-automatic classification algorithms and interfaces may be provided for classifying and ranking web pages within a hierarchical category structure. Such technologies and algorithms may be of generally conventional design, and a detailed description is omitted as not being critical to the present invention.

In one embodiment, an entry in page index 170 includes a search term, a reference (e.g., a URL or other encoded identifier) to a page in which that term appears and a context identifier for the page. The context identifier may be used for grouping similar results for search terms that may have different meanings in different contexts. For example, the search term "jaguar" may refer to the British automobile, to an animal, to a professional football team, and so on. The context identifier for a page can be used to indicate which of these contexts is applicable. In one embodiment, the context identifier includes a category for the page, with the category being assigned from a predefined hierarchical taxonomy of content categories. A page reference may be associated with multiple context identifiers, so the same page (or a link thereto) may be displayed in multiple contexts. In some embodiments, context identifiers are automatically associated with page links by the system as users perform various searches; the identifiers may also be modified and associated with links manually by a team of one or more index editors.

Search server system 160 is configured to provide data responsive to various search requests received from a client system 120, in particular from search module 126 and/or user interface module 127. For example, search server system 160 may include a query response module 164 that is configured with search related algorithms for identifying and ranking Web pages relative to a given query, e.g., based on a combination of logical relevance (which may be measured by patterns of occurrence of search terms in the query), context identifiers, page sponsorship, etc.

In accordance with an embodiment of the present invention, query response module 164 is also configured to receive and make use of context vector data that may be provided in association with a query in order to further enhance the response to queries. Use of context vector data in responding to queries is described further below. Query response module 164 may also enhance search result information with additional information (e.g., links and/or advertising copy) obtained from a sponsored content database 162. Sponsored content database 162 may be implemented as part of page index 170 by the inclusion of additional fields in each entry to identify page references that are sponsored and keywords for triggering the display of sponsored content, or it may be implemented in a separate database.

In some embodiments, search server 160 also includes a context processing module 166 that is configured with various algorithms for processing received content to generate a context vector representative of the received content. In general, a context vector may include any data that represents all or part of the content. For example, one embodiment of a context vector for text content may include keywords such as terms (e.g., words or phrases) that appear in the content, and each such term may have an associated frequency count reflecting how many times that term occurs in the content. Other types of data may also be included, e.g., URLs or other data identifying any links that may be included in the content, the URL or other identifier of the page that contains the content, category data associated with the content or with a page that contains the content, and so on.

In some embodiments, a content augmentation server 180 is also provided. Content augmentation server 180 communicates via Internet 140 with client application 125 to enhance the content of a Web page being displayed with "special content" that is advantageously selected based on context vector data associated with the displayed page. In circumstances where the user has indicated an interest in information related to a particular context (examples are described below), client application 125 transmits a context vector to content augmentation server 180, and content augmentation server 180 responds with special content to be added to a Web page being displayed by client application 125.

In one embodiment, content augmentation server 180 and search server 160 are under common control, and content augmentation server 180 advantageously selects special content from sponsored content database 162. In another embodiment, content augmentation server 180 may be independent of search server 160 and may have its own database of special content from which selections can be made based on context vectors provided by client application 125.

It will be appreciated that the search system described herein is illustrative and that variations and modifications are possible. The content server, search server, and content augmentation server systems may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of the context identifiers).

C. Contextual Search Interface

As mentioned above, user interface module 127 of client application 125 generally includes one or more interfaces enabling the user to submit queries to search server 160, e.g., by navigating a browser to a search page hosted by search server 160 or by providing a toolbar interface for query submission. Such interfaces may be implemented in a generally conventional fashion.

In accordance with an embodiment of the present invention, in addition to (or instead of) such interfaces, users may also enter contextual queries using a "contextual search" interface that may be implemented as a visible element on any "hosting" Web page. (As used herein, the term "hosting Web page," or "hosting page," is to be understood as referring to any page that includes at least one contextual search interface; hosting pages might or might not be under common control with search server 160 or content augmentation server 180.) Each contextual search interface has a context vector associated with it. The context vector, which need not be visible on the hosting page, provides additional data reflecting the content of the hosting page (or a portion thereof). This data can be used e.g., by query response module 164, during query processing as described below.

Figures 3, 4:
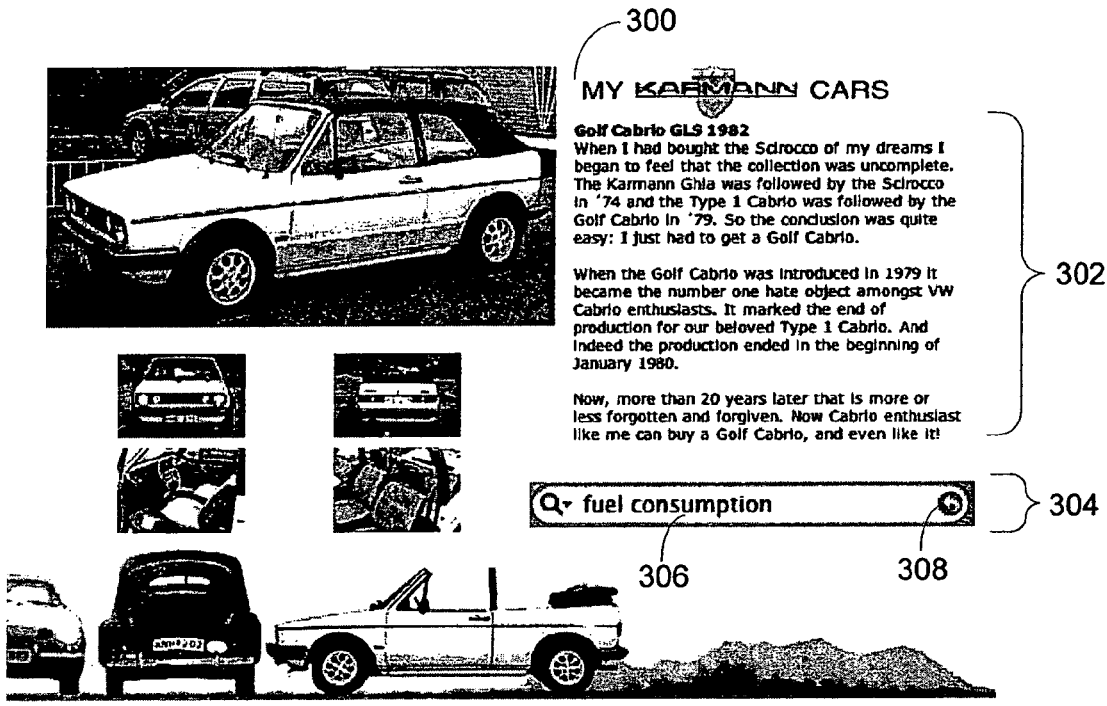
FIG. 3 is an illustration of a Web page with a contextual search interface according to an embodiment of the present invention.
FIG. 4 is an illustration of a context vector for a contextual search according to an embodiment of the present invention.

An example of a contextual search interface will now be described. FIG. 3 shows a hosting page 300 that has some content 302, as it might appear when displayed on client system 120 of FIG. 2. Hosting page 300 includes a contextual search interface 304 that is advantageously placed near content 302. A user may initiate a contextual search by entering a query (e.g., "fuel consumption") into a text field 306 of interface 304 and activating a "submit" control 308, which may be, e.g., a clickable button. The source code (not shown) for hosting page 300 includes a context vector associated with contextual search interface 304. In this embodiment, the context vector is not actually displayed in page 300, although its data is included with the source code provided to client application 125 when page 300 is requested.

The context vector, which may be implemented in various ways, advantageously includes one or more terms and/or category labels (or any other data) representative of the neighboring content 302. FIG. 4 is an example of a context vector 400 that might be provided for a search initiated from contextual search interface 304 of FIG. 3. Context vector 400 includes a list of terms 402 ("cabrio," "golf," etc.) that appear in content 302 and additional information associated with each term. In this example, the additional information includes a term frequency 404, a document frequency 406, a weight 408, and a term type 410. Tern frequency 404 reflects the number of times the term occurs in content 302. Document frequency 406 reflects the number of documents in the search corpus that contain the term. Weight 408 reflects an importance assigned to the term and may be computed from information such as whether the term occurs in text or in headings, the term frequency 404, and/or the document frequency 406. Term type 410 can be used to distinguish different types of data that may be included in the context vector, e.g., terms from the text, category data, URL data, and so on. It is to be understood that a context vector may also include more, fewer, or different elements from those shown in FIG. 4, and the elements may be provided in any desired format. In one embodiment, context vector 400 is included in the source code for hosting page 300 in association with the code for contextual search interface 304.

When a user using client application 125 (of FIG. 2) to view hosting page 300 initiates a search by entering a query into text field 306 and activating submit control 308, the query that is sent by client application 125 to search server 160 for processing advantageously includes not only the explicit user input from text field 306 but also a representation of context vector 400. For example, in one implementation of contextual search interface 304, Web page 300 includes program code for sending an HTTP (hypertext transport protocol) request to search server 160 in response to submit control 308. This program code can include code for appending the user's query and a representation of the context vector as additional data to the URL used for the HTTP request.

In addition to the user's query (from text field 306) and context vector 400, search server 160 may also receive other metadata, such as an identifier of the user (if known), the user's IP address, the time of day, and so on. This metadata, which might or might not be specific to the hosting page or the contextual search interface, may be obtained from client application 125 or from other sources.

Upon receiving a query initiated through contextual search interface 304, search server 160 uses query response module 164 to execute a search based on the user's query and the context vector (and optionally any other available metadata). Query response module 164 generates and ranks a list of hits. The resulting list of hits, which generally depends at least in part on the context vector, is returned to the user, e.g., in the form of a search results page. In executing the search, the context vector may be used in various ways. For instance, in one embodiment, the user's query (e.g., the explicit input in text field 306 in FIG. 3) is modified by adding one or more keywords selected from the context vector; in another embodiment, the search is executed using the user's query as submitted, with keywords and/or category data from the context vector used in ranking the results. Additional embodiments are described below.

Figure 5:
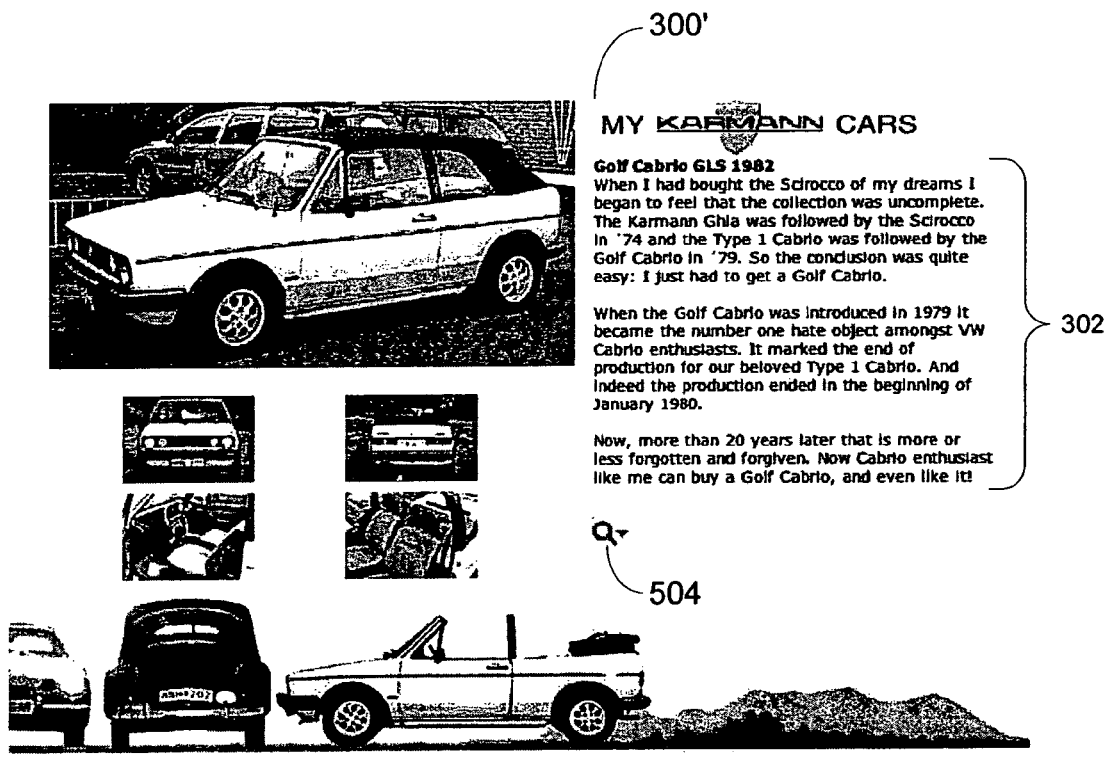
FIG. 5 is an illustration of a Web page with a contextual search interface in an inactive state according to an embodiment of the present invention.

In some embodiments, contextual search interfaces for a hosting page may be initially displayed in an "inactive" state in which only a relatively small icon appears on the page. An example of an inactive contextual search interface is illustrated in FIG. 5. Hosting page 300' is generated from the same source code as hosting page 300 of FIG. 3 and has the same content 302. In page 300', however, only a small contextual search icon 504 is displayed, rather than the full contextual search interface 304 shown in FIG. 3. Icon 504 represents an inactive contextual search interface; a user viewing page 300' who desires to perform a contextual search related to content 302 can activate the contextual search interface, e.g., by clicking on or otherwise selecting icon 504. Selecting icon 504 causes page 300 of FIG. 3, with the active contextual search interface 304, to be displayed so that the user can perform a contextual search.

Any number of contextual search interfaces may be provided on a hosting page, and each contextual search interface may have its own context vector that reflects the nearby content. For example, FIG. 6 shows a hosting page 600 whose content includes several summaries 602, 604, 606 of different news stories. Each summary 602, 604, 606 has a respective contextual search icon 612, 614, 616 placed near it. Each icon 612, 614, 616 is the inactive state of a different contextual search interface, each of which has its own context vector derived from the adjacent summary 602, 604, 606. Any one of these icons can be activated by a user and then used to initiate a contextual search (e.g., in the same manner as described above with reference to icon 504 and active contextual search interface 304). The context vector for a search initiated from icon 612 is advantageously derived from summary 602 while the context vector for a search initiated from icon 614 is advantageously derived from summary 604 and so on. Since icons 612 and 614 have different associated context vectors, the search results (the hits or their ranking or both) will generally differ for searches initiated via icons 612 and 614, even if the same query is entered.

In one embodiment, described further below, the creator of a hosting page may determine how many contextual search interfaces to include on the page, where they are to be located, and which portion(s) of the page should be used to define the context for the search.

The following sections describe example embodiments for creation of contextual search interfaces and context vectors (Section II), use of context vectors in processing queries (Section III), and additional optional features for further enhancing contextual searches (Sections IV and V).

II. Creation of Contextual Search Interfaces and Context Vectors

A. By Content Providers

In some embodiments, one or more contextual search interfaces can be added to a Web page at the discretion of a content developer that creates the Web page. For example, a search provider (or other promulgator of contextual search technologies) may publish an application program interface (API) for implementing contextual searches. The API includes a format for specifying contextual search requests so that such requests can be recognized and processed by search server 160. In one embodiment, the API specifies a base URL for submitting contextual searches to search server 160 and a format for enhancing the base URL with additional data representing the user's query and the context vector. The API may also specify formats for encoding the query and/or context vector as appropriate to a particular implementation.

In some embodiments, the API may also specify the appearance and/or features of the contextual search interface. For example, the API might specify whether the interface should initially be displayed as an inactive-state icon, what such an icon should look like, and a standard phrase to be displayed with the icon to alert users to the opportunity for performing a contextual search. Other aspects of the API might specify features of the contextual search interface in its active state, such as whether a text box and/or other input fields are to be provided and what such fields should look like. While optional, providing uniform specifications for the esthetic aspects of contextual search may assist in promoting user awareness and recognition of contextual search interfaces.

All or part of the API may be provided by making available images that can be inserted into the Web page or suitable code blocks in commonly used Web page coding languages (such as HTML) that content creators can simply insert into their pages.

The content provider can implement a contextual search interface by including appropriate code in the source code for the hosting page and supplementing this code with appropriate data for a context vector representing the actual content of the hosting page. Any code in any language may be used, as long as execution of the code results in contextual search requests, in the API-compliant format, being generated and submitted to search server 160 in response to input to the contextual search interface.

Figure 7:
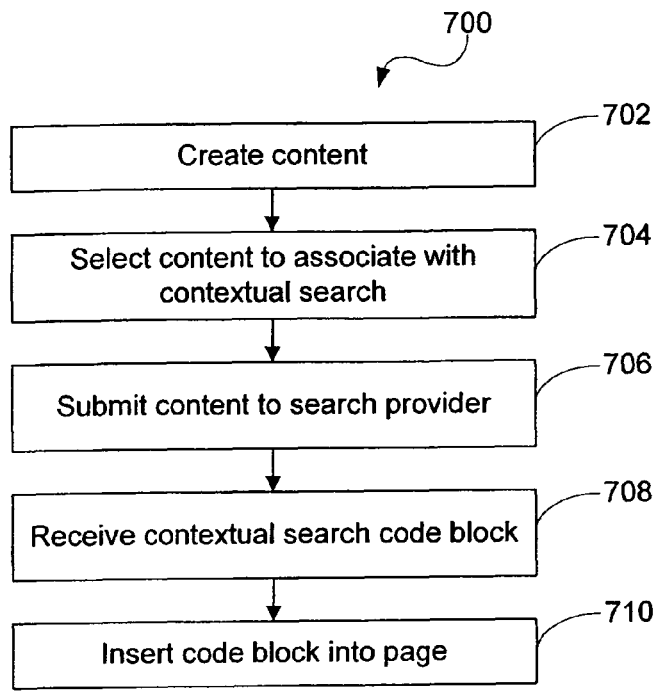
FIG. 7 is a flow diagram of a process performed by a content developer for creating a contextual search interface according to an embodiment of the present invention.
Figure 8:
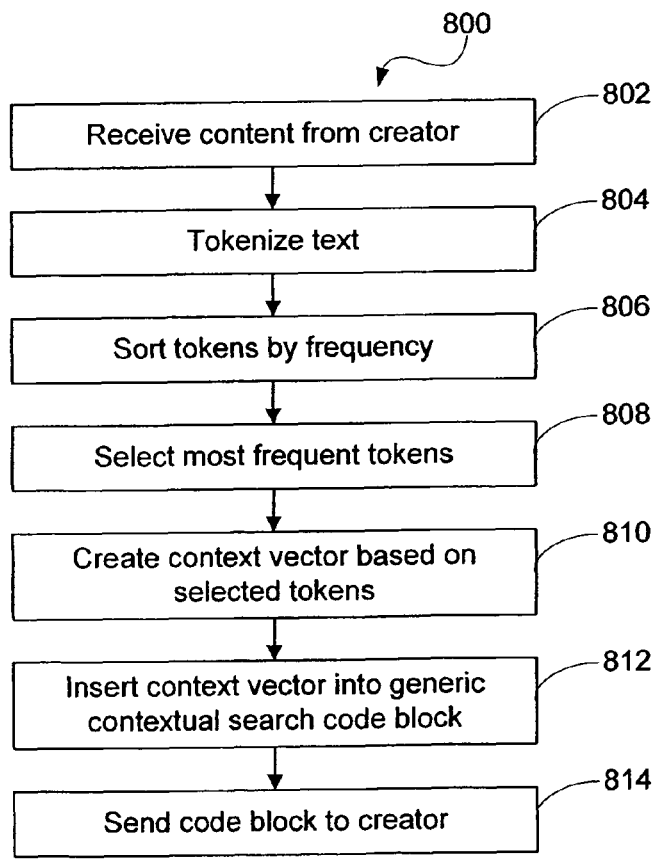
FIG. 8 is a flow diagram of a process for generating a context vector according to an embodiment of the present invention.

In other embodiments, the search provider (or other promulgator of contextual search technologies) further facilitates creation of contextual search interfaces by content providers, e.g., by automating the generation of some or all of the contextual search code for a hosting page. As one example, generation of context vectors from hosting page content may advantageously be automated. FIGS. 7 and 8 are flow diagrams illustrating a partially automated process for creating a contextual search interface, with FIG. 7 showing a process 700 performed by the content developer and FIG. 8 showing a process 800 performed by the search provider.

Process 700 begins with the content developer creating or modifying content for a Web page (step 702) that is to include a conceptual search interface. The content may be created using any manual or automatic technique, including the use of conventional Web development software. At some point, the content developer determines that it would be desirable to have a contextual search interface associated with some portion (or all) of the hosting Web page's content. The content developer selects the content that is to be associated with the contextual search interface (step 704) and submits it to the search provider (step 706).

Submission of content to the search provider may be done in a number of ways. In some embodiments the search provider offers a Web-browser-based context analysis interface for content providers. This interface may be, e.g., an interface to context processing module 166 of search server 160 shown in FIG. 2. The content developer may navigate his own browser to this interface and enter (e.g., by copying and pasting) appropriate content from the hosting page. In other embodiments, the content developer may navigate a browser to the search provider's context analysis interface and submit a URL for the hosting Web page. In still other embodiments, the search provider may distribute a software tool (e.g., incorporating aspects of context processing module 166) that the content provider can use to select content and submit it to the search provider without using a Web browser. This tool may take various forms, such as a desktop tool or a widget that can be integrated into various Web content development software programs.

Upon receiving content from a developer, context processing module 166 analyzes the content and generates a context vector. FIG. 8 is a flow diagram of a process 800 that may be implemented in context processing module 166. Process 800 begins when content to be associated with a contextual search interface is received by context processing module 166 (step 802).

At step 804, the received content is tokenized. Tokenizing may be done using conventional techniques and may include, e.g., detecting word boundaries, canonicalizing words (e.g., removing suffixes, correcting spelling errors or variants, and the like), eliminating various words that are too common to be helpful in searches (e.g., "the," "and"), and so on. At step 806, the tokens are sorted according to suitable criteria, such as frequency of occurrence of the term in the content, and at step 808 the most frequently occurring tokens are selected for inclusion in the context vector. The number of tokens selected may be limited, e.g., to some integer K.

At step 810, a context vector is created using the tokens. In one embodiment, the context vector includes the selected tokens as well as their respective frequencies and other optional information. In some embodiments, co-occurrences and correlations between tokens are also used to identify phrases that can also be incorporated into the context vector. (For instance, in content 302 of FIG. 3, the phrase "Golf Cabrio" might be identified.) In addition, URLs (or other identifiers) of any linked-to documents included in the content or a URL (or other identifier) for the content itself may also be included. More generally, any information representative of the content, or some aspect of the content, may be included in a context vector.

At step 812, the context vector is inserted into a block of generic code implementing a contextual search interface. In one embodiment, the generic code block includes a template for an enhanced URL that is to be used for sending contextual queries to the search server, and step 812 includes inserting the context vector (or an encoded representation thereof) into this template. The generic code block may also include other code, such as code for inserting the user's query into the enhanced URL before sending it to the search server, code for displaying the contextual search interface in its active and/or inactive states, and so on. The resulting code block, including the context vector, is returned to the content developer at step 814.

Referring again to FIG. 7, at step 708 the content developer receives the code block from context processing module 166.

At step 710, the content developer inserts the code block into the hosting Web page at the desired point, thereby adding the contextual search interface to the page.

It will be appreciated that the processes for creating contextual search interfaces described herein are illustrative and that variations and modifications are possible. Steps described as sequential may be executed in parallel, order of steps may be varied, and steps may be modified or combined. Various steps such as selection of content and insertion of the contextual search code block may be automated or performed manually. In one alternative embodiment, the search provider may provide a context processing module that can be installed and run on the content provider's system, so that information need not be sent to the search provider in order to create the context vector. In addition, in some embodiments creation of contextual search interfaces may be automated, e.g., so that a context vector is automatically updated when page content is updated. For instance, if page 400 of FIG. 4 represents a news page where the top stories are frequently changed, a process may be provided for automatically updating the context vector for one of the contextual search interfaces any time its associated story changes.

Other algorithms for generating context vectors may also be implemented. For example, some algorithms may weight terms that appear in headings, subheadings, metatags or other selected fields higher than terms in the body text. Some algorithms may also take into account non-textual content (e.g., images or media content) for which suitable content descriptors are available or can be determined. Terms in the context vector are not limited to single words; a term may also be a phrase (2 or more words occurring adjacent to each other). In some embodiments, the context vector may be created based on information other than terms found in the content. For instance, the content provider may be prompted to specify a category or other context identifier for the content, and this information may be included in the context vector. In another embodiment, the context vector may include information about links included in the content (e.g., the URLs of such links or category information for the linked-to pages).

In some embodiments, the context vector may be included in the contextual search interface code block in an encoded form. For example, hash functions or other suitable techniques may be used to represent various tokens in the context vector. As another example, the complete context vector data might be stored in a table or database accessible to the search server, and the code block might include a key or other code that the search server can use to look up the context vector data during query processing.

B. By Users

In another embodiment, a user viewing any Web page can create a contextual search interface for that page (or for a portion thereof). For example, the search provider may provide a browser toolbar that has a "contextual search" widget enabling the user to select as context for a search query a portion of any Web page displayed in the browser window.

Figure 9:
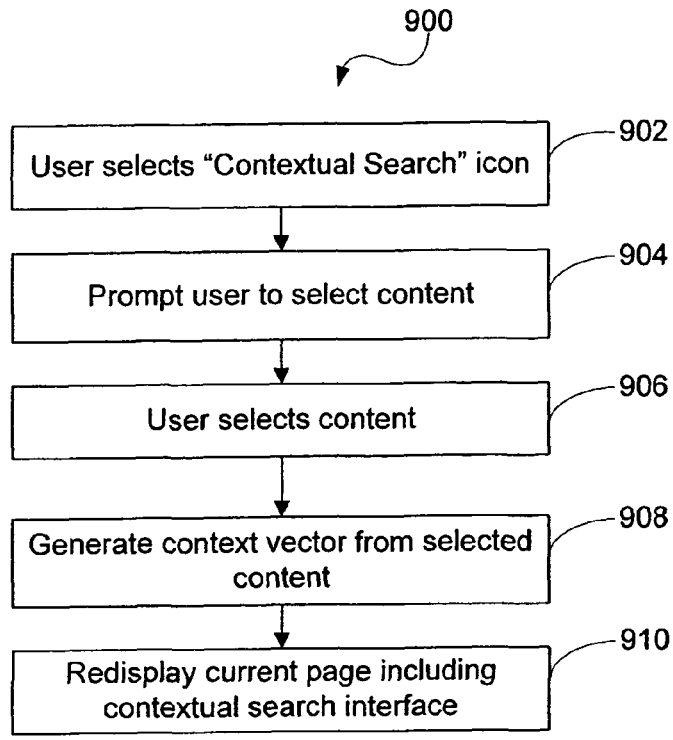
FIG. 9 is a flow diagram of a process for user creation of a contextual search interface according to an embodiment of the present invention.

FIG. 9 is a flow diagram of a process 900 for user creation of a contextual search interface. When process 900 begins, the user is viewing a Web page using a browser (e.g., an aspect of user interface module 127 of client application 125 of FIG. 2). The user's browser is equipped with a toolbar that has a "contextual search" widget. The page being viewed might or might not include a contextual search interface supplied by the content provider. At step 902, while viewing the page, the user selects the "contextual search" button from the toolbar, e.g., by clicking on it. In response, at step 904, the browser prompts the user to select a portion of the displayed page as context for the search. The prompt may include, e.g., changing a mouse cursor to a shape indicative of selection, and/or displaying a text prompt.

At step 906, the user selects part or all of the displayed page, e.g., by clicking and dragging a mouse cursor over a region of the displayed page. Selected text may be shown with highlighting (e.g., modified colors or a box drawn around the content) to provide visual feedback to the user. In some embodiments, other content selection mechanisms may be provided in addition to or instead of click-and-drag techniques. For example, a user may be able to select the entire page by pressing a predefined key, to select a paragraph by clicking while the mouse cursor is positioned anywhere in the paragraph, or to select a section by clicking while the mouse cursor is positioned in the section heading.

At step 908, client application 125 generates a context vector from the selected content. In one embodiment, client application 125 may submit the selected content to context processing module 166 at search server 160 for context-vector generation in accordance with process 800 described above. In another embodiment, client application 125 is configured to process content locally to generate a context vector (e.g., via steps of process 800) without transmitting information to the search server. Such processing capability may be implemented, e.g., by including a context processing module as part of specialized search module 126 of client application 125 of FIG. 2.

At step 910, the browser redisplays the current page, adding a contextual search interface at or near the selected portion of the page. In this embodiment, the newly added contextual search interface may appear initially in an active state so that the user can simply enter and submit a query without first activating the interface, or it may appear in an inactive state. Once created, a user-created contextual search interface advantageously behaves similarly to contextual search interface 304 described above; specifically, when the user enters a query through a user-created contextual-search interface, the client application submits the query and the context vector associated with the user-created contextual search interface to the search server.

It will be appreciated that process 900 is illustrative and that variations and modifications are possible. Steps described as sequential may be executed in parallel, order of steps may be varied, and steps may be modified or combined. For instance, the user may select the content first, then activate a "contextual search" button in the search toolbar. Instead of adding a contextual search interface to the Web page, a user-created contextual search interface may be placed in the toolbar (e.g., in place of a standard non-contextual search interface) or provided in a separate pop-up window.

In other embodiments, rather than generating a context vector in advance of a query, the client application may send the selected content together with the user's query to the search server, and the search server may generate the context vector (e.g., using context processing module 166) as part of its query processing activity. This context vector may be sent back to the client application, which may cache it for subsequent reuse.

In another embodiment, a user may be able to refine the context for a pre-existing contextual search interface, e.g., by selecting a portion of the accompanying text. Where such a selection is made, the context vector associated with the contextual search interface can be modified, e.g., to include only terms that appear in the selected text, thereby providing users a further degree of control over how the context is defined.

In still another embodiment, a client application might also include a module for creating contextual searches that is accessible via an icon on the user's desktop or in an operating system toolbar. Such a module may enable a user to create context vectors for performing contextual searches based on content other than Web pages, including documents open in a word processing or file viewer application, e-mail messages, instant messages, and the like. The user may activate this icon at any time, whether or not a browser is open, and may select content for creating the context vector from any document on her desktop (including any Web pages that happen to be displayed). The user-created contextual search interface for the selected content appears, e.g., in a pop-up window or dialog box located near the selected content, or in any other suitable user interface element. When the search is executed and results are returned, the client application advantageously opens a browser window for displaying the results and allowing the user to navigate to the hit pages or sites.

III. Use of Context Vectors in Query Processing

As described above, when a contextual search interface such as interface 304 of FIG. 3 is active, a user may initiate a contextual search by entering a query into text field 306 and operating submit button 308. In response, contextual information, which can aid the search server in responding to the user's query, is supplied via a context vector (e.g., context vector 400 of FIG. 4) that is associated with the contextual search interface and automatically delivered to the search server with the user's query.

A search server (e.g., search server 160 of FIG. 2) receives a contextual search query, which includes both the user's query and the context vector, and executes the search, e.g., using query response module 164. Algorithms for processing contextual search queries advantageously exploit the premise that the user's interest is likely to be related to the neighboring content; accordingly, the context vector, which represents that content, is advantageously used in generating search results. It should be noted that a user who does not want a search to be connected to surrounding content may use a different interface (e.g., a search toolbar or the search provider's Web interface) to perform a non-contextual search, and search server 160 may be configured to process both contextual and non-contextual queries.

Figure 10:
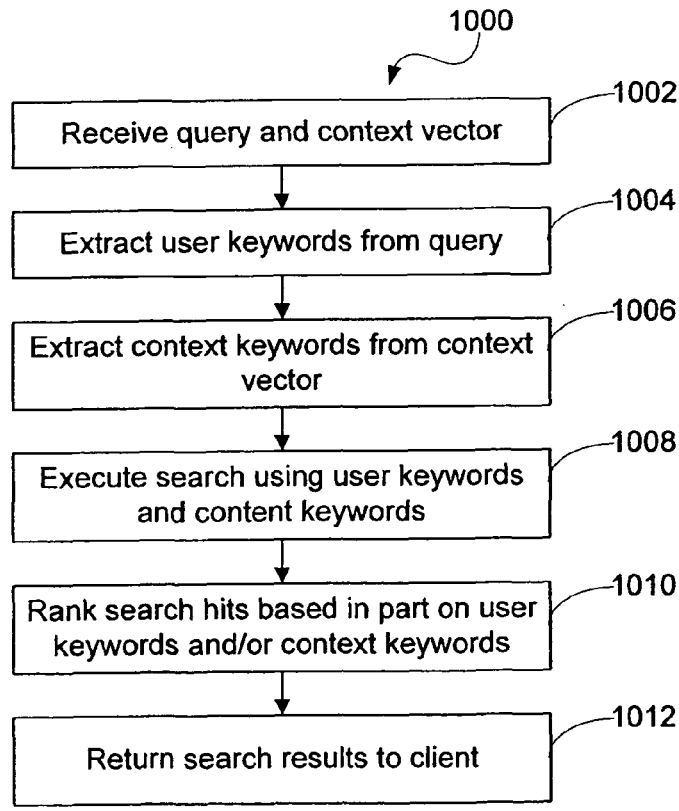
FIG. 10 is a flow diagram of a process for executing a contextual search according to an embodiment of the present invention.

Specific algorithms for processing contextual search queries will now be described. FIG. 10 is a flow diagram of one such process 1000, in which search terms provided by the user are supplemented using one or more additional terms from the context vector.

At step 1002, a contextual query, including at least one user-supplied term and an associated context vector, is received. At step 1004, one or more user keywords are extracted from the user-supplied terms, e.g., using conventional query parsing techniques, which may include detecting word boundaries, canonicalizing words (e.g., removing suffixes, correcting spelling errors or variants, and the like), eliminating words that are too common to be helpful in searches (e.g., "the," "and"), and so on.

At step 1006, one or more context keywords are extracted from the context vector to supplement the user keywords. In some embodiments, context vectors include terms that have already been parsed and canonicalized (e.g., as described for process 800 above) and so are already suitable for use as keywords. In other embodiments, parsing and canonicalization may be performed for terms in the context vector as well. In addition, step 1006 may include determining how many and which terms from the context vector should be used as context keywords. For instance, in some embodiments, only terms having at least a minimum frequency or weight might be selected, or a limit might be placed on the number of terms that can be selected, with the most frequent or highest weighted terms being selected first. The number of context keywords selected may also depend on the number of user keywords (e.g., for queries with more user keywords, fewer context keywords might be selected). Step 1006 may also include detecting and removing from the query any context keywords that are redundant with user keywords. Redundant keywords may include exact duplicates as well as known synonyms.

At step 1008, a search is executed using a query that includes the user keywords and the context keywords. Search execution may incorporate conventional techniques for identifying Web pages that contain one or more (or, in some embodiments, all) of the keywords; such pages are referred to herein as "hits" (or "search hits"). At step 1010, the search hits are ranked based on relevance as determined by a suitable ranking algorithm. Conventional algorithms for scoring each hit page based on frequency and/or proximity of keywords in the hit page may be used, with the user's keywords and/or the contextual keywords being taken into account in the scoring. In addition, any terms from the context vector that were not selected as keywords may be used in determining page scores or rankings. Other criteria, including the number of pages linking to the hit, user evaluations and preferences related to hit pages, and/or sponsorship of various hit pages may also be considered in determining the ranking.

At step 1012, the search results are returned to the user. In one embodiment, the results are returned as a Web page displayable via the user's browser, with links to the various hit pages or sites. The results page may be displayed, e.g., by redirecting the browser from the hosting page to the results page or by opening a new browser window for the results page. Where many hits are to be returned, multiple interlinked results pages may be generated. The results page may display both the user's original query and the context keywords that were added to the search query. In some embodiments, this information is presented using an interactive form via which the user can modify her query or the context keywords (or both) and submit the modified contextual query to search server 160.

Figure 11:
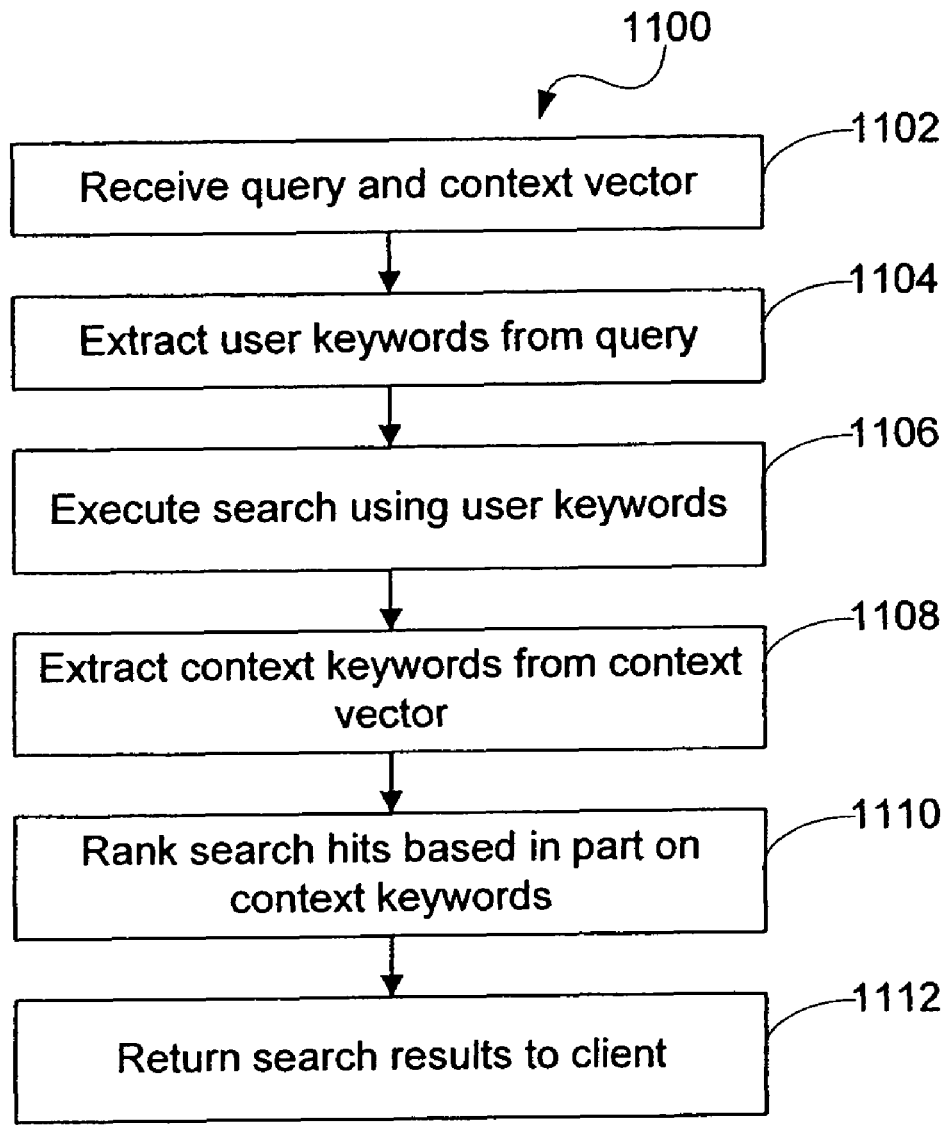
FIG. 11 is a flow diagram of another process for executing a contextual search according to an embodiment of the present invention.

FIG. 11 is a flow diagram of an alternative process 1100 for executing contextual searches. In process 1100, the user's query terms are used without additional context keywords to generate hits, and context data is incorporated into the ranking algorithm. More specifically, at step 1102, a contextual query, including at least one user-supplied term and an associated context vector, is received. At step 1104, one or more user keywords are extracted from the user-supplied terms; this step may be similar to step 1004 of process 1000 described above. At step 1106, a search is executed using a query made up of the user keywords, generating a list of hits. Unlike process 1000, keywords based on the context vector are not used to supplement the user keywords in the search query. As described for process 1000 above, search execution may be implemented using conventional techniques.

At step 1108, context keywords are extracted from the context vector; this step may be similar to step 1006 of process 1000 described above. At step 1110, the hits are ranked using the context keywords; in some embodiments, the user keywords may also be used for ranking The ranking algorithms may be generally similar to those used in step 1010 of process 1000. At step 1112, the results are returned to the user, similarly to step 1012 of process 1000. As in process 1000, the user's query and the context keywords may be presented using an interactive form via which the user can modify her query or the context keywords (or both) and submit the modified contextual query to search server 160.

It should be noted that processes 1000 and 1100 may result in lists of hits that differ as to content and/or order of the hits. Other variations in these processes are also possible. For instance some terms from the context vector may be used as context keywords in the search query while other terms are used only for ranking the hits. In another variation, only context keywords might be used for the search while user keywords are used only for ranking the search hits.

In any event, it should be understood that page rankings based on the user keywords and/or context keywords may be further modified based on other page ranking algorithms using various metadata for the query. Examples include the use of user profile data (if the user's identity is known), as well as various heuristics for resolving ambiguous terms, inferring local intent, etc. In addition to the list of hits, the search results page may also include sponsored results or other content as determined by the search provider.

IV. Contextual Search Interfaces with Augmented Content

As described above, a contextual search interface advantageously includes active and inactive states. In the inactive state, a small icon may be displayed (e.g., as shown in FIG. 5); this can reduce visual clutter on the page while still informing the user that a contextual search option is available. In the active state, a query form and submit control are displayed (e.g., as shown in FIG. 3).

In some embodiments, when the contextual search interface is active, the query form may be augmented with additional content (referred to herein as "special content") that may be of interest to the user. In general, when a user chooses to activate an inactive contextual search icon, it can be inferred that the user is likely to be interested in content related to that context. The content augmentation feature allows such content (or links to such content) to be presented as part of an active contextual search interface and not presented (or hidden) for inactive contextual search interfaces. Special content can be selected dynamically based on the context vector of the contextual search interface that is being activated.

In one embodiment, the augmented content includes shopping-related content (referred to herein as "Shop in Context"), in which opportunities to buy products related to the content are offered to the user. For example, Web page 600 of FIG. 6, described above, includes summaries of different news stories 602, 604, 606, each with its own contextual search icon 612, 614, 616. A user may activate one of these icons, e.g., icon 612, by clicking on it, thereby causing an active contextual search interface to be displayed and "Shop in Context" content to be added to the displayed page.

Figure 12:
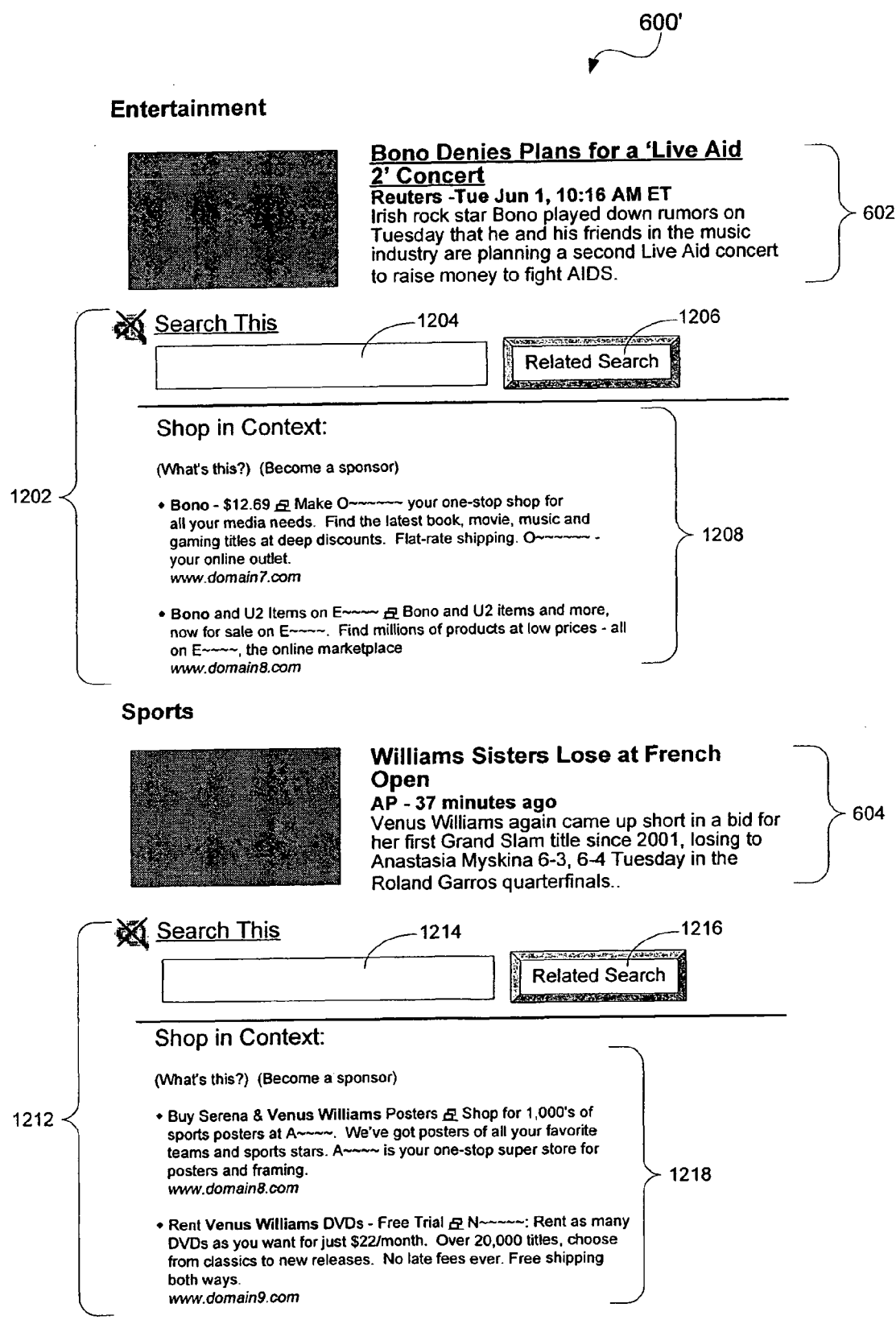
FIG. 12 is an illustration of a Web page with contextual search interfaces including content according to an embodiment of the present invention.

FIG. 12 shows a portion of Web page 600 after contextual search icon 612 has been activated. Icon 612 has been expanded to an augmented contextual search interface 1202, which includes a search box 1204 and a submit control 1206 (labeled "Search" in this example) that operate similarly to previously described contextual search interfaces. Augmented contextual search interface 1202 also includes "Shop in Context" content 1208, which in this case provides links and text identifying sites where one can buy merchandise related to the subject of news story 602 (specifically, to the musician Bono).

The "Shop in Context" content for a contextual search interface is advantageously selected based on the context vector, so that activating a different contextual search interface on the same page will generally produce different "Shop in Context" content. For example, FIG. 12 also includes a contextual search interface 1212 associated with news story

604; interface 1212 would appear when contextual search icon 616 of FIG. 6 is activated. Contextual search interface 1212 includes a text field 1214 and a submit button 1216, as well as "Shop in Context" content 1216. Because story 604 relates to a different subject from story 602, "Shop in Context" content 1216 (which relates to Venus Williams) is different from content 1208.

In some embodiments, special content such as "Shop in Context" content is generated dynamically by sending a content request from client application 125 (FIG. 2) to content augmentation server 180 when a contextual search interface is activated by a user. This content request includes the context vector, which content augmentation server 180 uses to select appropriate special content. Content augmentation server 180 may be operated by a search provider or by another promulgator of contextual search technologies.

Figure 13:
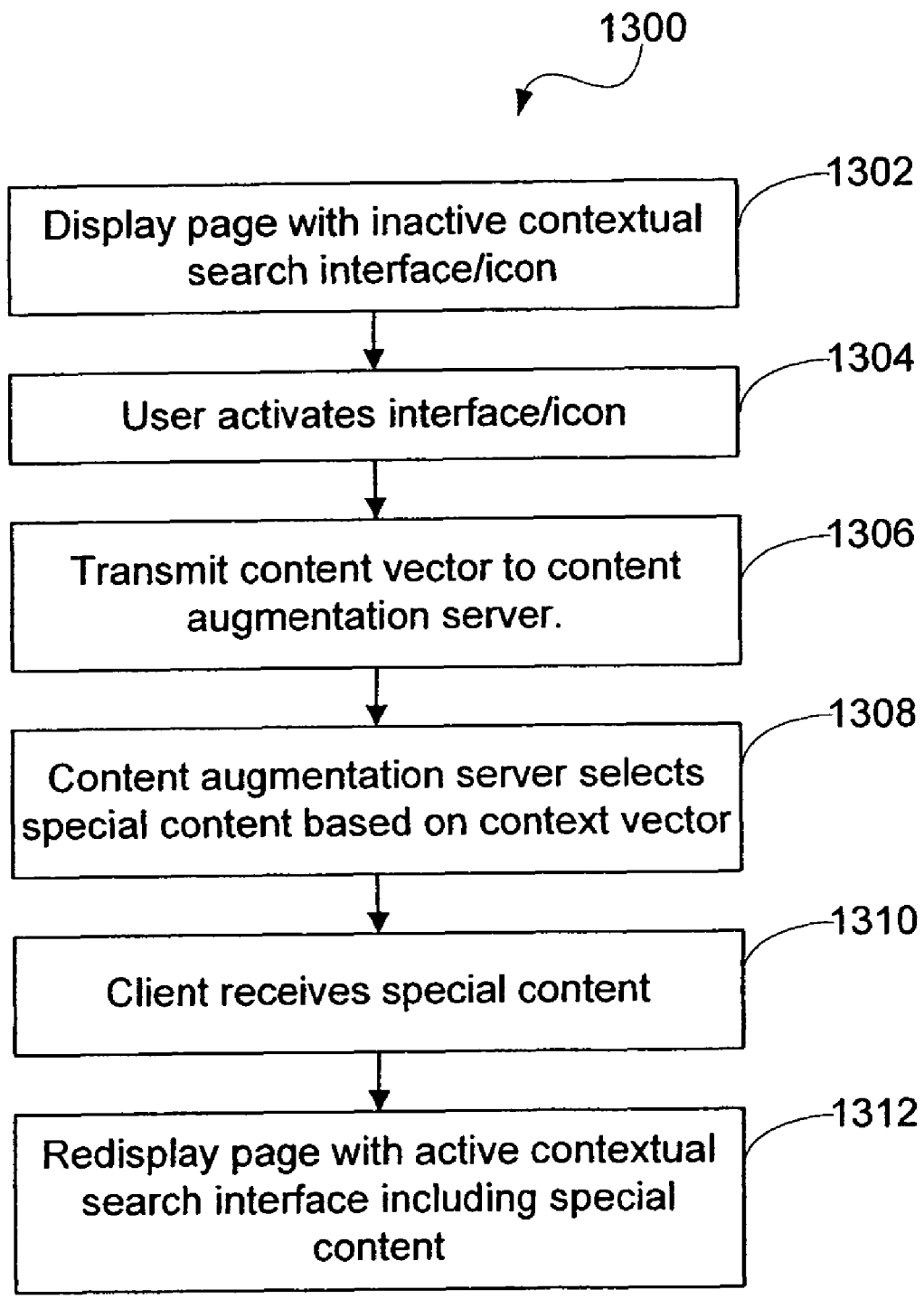
FIG. 13 is a flow diagram of a process for selecting augmented content according to an embodiment of the present invention.

FIG. 13 is a flow diagram of a process 1300 for generating an augmented contextual search interface that includes special content (e.g., "Shop in Context" content). At step 1302, a hosting page, such as page 600 of FIG. 6, is displayed in the user's browser. As described above, the hosting page includes one or more contextual search interfaces, each in the inactive (icon) state. At step 1304, the user activates one of these interfaces, e.g., by clicking on it. At step 1306, a content request that includes the context vector for the newly activated interface is transmitted to content augmentation server 180.

At step 1308, content augmentation server 180 generates or selects content to be added to the hosting page based on the context vector. For example, content augmentation server 180 may access sponsored content database 162 (shown in FIG. 2), which advantageously associates specific items of sponsored content with various keywords. Content augmentation server 180 can extract keywords from the received context vector and select one or more items of sponsored content from database 162 based on the keywords. The number of items selected may be limited if desired (e.g., in FIG. 12, two items are selected for each contextual search interface). Where more than the maximum number of items match the keywords, selection among the items can be based on various criteria, e.g., the number or importance of the keywords matched by each item and/or the terms of sponsorship agreements between a provider of content augmentation server 180 and various sponsors of the content in database 162.

At step 1310, content augmentation server 180 returns the special content to client application 125, which redisplays the host page (step 1312) including the special content. Any hosting page content following the insertion point of the contextual search interface may be moved down as needed to make room for the special content.

It will be appreciated that the process described herein is illustrative and that variations and modifications are possible. Steps described as sequential may be executed in parallel, order of steps may be varied, and steps may be modified or combined. In some embodiments, the special content may be selected in advance, e.g., when the contextual search interface is created or updated, and incorporated into the source code for the hosting page so that a real-time request to a content augmentation server is not required. It is to be understood that where a hosting page includes multiple contextual search interfaces, special content can be displayed for any active interfaces without also being displayed for any inactive ones.

Special content is not limited to shopping or advertising information. Other types of special content might include links to news stories related to the content, links to the most popular Web sites related to the content, related images or media content, or any other type of content. any type of special content can be selected based on the context vector, e.g., by accessing an appropriate database using the context vector. For instance, links to related news stories might be generated by querying one or more news servers or news sites using selected terms (or all terms) from the context vector. A list of the most popular related sites can be generated, e.g., by obtaining a listing of most popular sites and identifying sites from that list that contain terms from the context vector. Related images can be located by accessing an image database.

More generally, the context vector associated with a contextual search interface can be used in a variety of ways to identify related content. Using the content augmentation systems and methods described herein, displaying of such content can be deferred until the user has indicated interest in such content by activating a contextual search interface. Thus, the amount of information related to a particular topic that is displayed on the hosting page can be made dependent on the user's expressed interest in the topic.

V. Further Embodiments

Contextual search capability and context vectors have a variety of other embodiments and applications. Some examples will now be described; it is to be understood that these examples are illustrative and not limiting of the invention.

In some embodiments, context vectors can be also be used to facilitate entry of queries by users. For example, if a user begins to enter (e.g., by typing) a query into a search toolbar interface of a client application while viewing a hosting Web page, the client application might use context vector(s) from that page to generate auto completion suggestions for the query. This can be done regardless of whether a particular contextual search interface is active or inactive. For example, if at page 600 of FIG. 6, the user typed "V-E-N" into a search toolbar interface (not shown in FIG. 6), the client application might suggest "Venus" or "Venus Williams" as the intended text. The user could then hit the Enter or Tab key (or any other designated key) to accept the suggestion or just ignore the suggestion and keep typing. Similarly, if the user begins to type a query into a contextual search interface, the context vector for that interface may be used to generate auto completion suggestions for the user.

In other embodiments, the context vector may be used to implement a "queryless" search. From an active contextual search interface (e.g., interface 304 of FIG. 3), a user may simply activate the submit button without entering any query terms. If a contextual search with no user terms is submitted, the search server (or the client application) may be configured to construct and process a query based on the context vector or on selected terms from the context vector.

In some embodiments, the search server may collect data related to contextual searches and use this data to improve the results of such searches. Data may be collected, e.g., per context vector or per hosting page. The data may include log files containing queries that were received with a particular context vector or from a particular hosting page, clickthrough statistics indicating which hits users who entered the logged queries actually investigated, explicit user ratings of hit pages, and the like. This data may be used in various ways to improve the results of contextual searches. For example, when a query comes from a particular contextual search interface, the search server might include with the search results one or more suggestions for related queries that the user might want to explore next. The related queries can be determined, e.g., based on other queries that have frequently been received with the same context vector or from the same hosting page.

As another example, clickthrough data and/or explicit ratings data associated with hits resulting from searches using a given context vector or contextual search interface may be used to refine the scoring or ranking of search hits during processing of subsequent queries that include the same context vector or that originate from the same contextual search interface. For example, hit pages or sites that have been frequently visited or highly rated by previous users having a particular context (as represented by the context vector) are relatively likely to be useful to subsequent users having the same context; such hits may have their scores or rankings adjusted upward so that they receive more prominent placement. Conversely, hits that have been generally ignored or that have received low user ratings within a particular context are less likely to be relevant and may have their scores or rankings adjusted downward.

In addition, aggregated data about queries and/or clickthroughs originating from a particular contextual search interface may be shared with the content provider responsible for the contextual search interface, preferably without identifying individual users. The content provider can use such data to gain insight into the interests and behavior of users who visit the site, which may help the content provider to improve the usefulness and popularity of the site.

Query and/or clickthrough data may also be used for content augmentation. For instance, when a user activates a contextual search interface, the special content may include a list of the most frequent queries submitted via that interface or the sites most frequently visited by previous users of that interface. These queries or sites may be presented using active links so that the user can execute one of the queries or visit a site by clicking the link.

In some embodiments, a search server (or another server) may collect data about existing contextual search interfaces and define relationships between them based on their respective context vectors. For example, a "similarity" relationship might be defined between two interfaces that have a certain fraction of context vector terms in common; a "refinement" relationship might be defined where one interface's context vector includes all of the terms of another interface's context vector plus at least one additional term. In this manner, a graph with contextual search interfaces as nodes and the relationships as edges may be defined. A representation of the graph may be used during query processing. For instance, suppose that a contextual search interface A is a refinement of a contextual search interface B. When a query is submitted via interface B, terms from the context vector of interface A might be used in processing the query. Other relationships, including indirect relationships (e.g., if A is a refinement of B and B is a refinement of C, then it can be inferred that A is a refinement of C), may also be defined and used in query processing.

In still other embodiments, a contextual search query can be submitted to any search server, and different contextual searches can be submitted to search servers controlled by different entities, e.g., by configuring the contextual search interface so that the URL for submitting queries directs them to the desired search server. For instance, if a contextual search interface relating to automobiles is created and if a specialized server (with search capability) for automobile information is available on the Web, the contextual search may be routed to that server by including an Internet address of that server in the URL. In this way, contextual searches can provide users with access to search servers that are especially suited to their contexts, without the users having to know in advance that such a server exists. The ability to automatically direct a query to an appropriate server in a context-dependent manner may further enhance the appeal of contextual searches to users.

Selective routing of contextual queries may be implemented in various ways. For instance, where contextual search interfaces are created by content developers, the content developer may construct a query URL directed to the address of any server on the Web and may enhance the query URL with a query appropriately formatted for the targeted server. Such enhanced URLs advantageously include contextual terms (e.g., a context vector) as well as user-supplied terms.

Similarly, where contextual search interfaces are generated automatically, a software module that generates such interfaces may be configured to select an appropriate search server and format for the query URL based on the context vector. It is to be understood that the selected search server need not have any organizational connection to a creator or promulgator of the interface-generating software module, provided that the software module is capable of generating code that will cause a request to be transmitted to the selected search server in a format that the selected search server is capable of processing.

Where the search query is to be directed to a specialized search server, the active state of the contextual search interface may include special content as described above. This special content may be provided by the specialized search server or by a content augmentation server that may be controlled by a different entity. The special content may include information about the search server to which the search will be directed, such as a link to the search server's Web site.

In yet another implementation, the decision as to where to direct a contextual search query might be made at query execution time. For example, all contextual search queries could be directed to a search server (e.g., search server 160 of FIG. 2), and the search server could determine, based on a combination of the user query and context vector information, whether to redirect the query to a different server for processing. In this implementation, the decision to redirect a query might be dependent in part on the user-supplied element of the query. For instance, suppose the content for a contextual search interface relates to a new album. If a user enters the query "review" via the contextual search interface, that query could be redirected to a database of music reviews, while if the user enters the query "buy" via the same interface, that query might be processed by the search server without redirecting.

In some embodiments, different contextual search queries may be directed to the same search server but limited to different portions of a search corpus. For example, a search provider may divide Web pages into a number of potentially overlapping "properties," such as a "news" property, a "shopping" property, a "sports" property and so on. Each such property can be treated as a separate search corpus, and based on the query and the context vector, a search may be directed to any one or more of these properties. Where searches across multiple properties are performed, the property that returned a particular result may also be used as a factor in ranking the results.

Other embodiments include user personalization features allowing data specific to the user as well as the context to inform the search results. For example, the search provider may maintain a user profile for each registered user of its services. When a registered user who is logged in executes a search (contextual or otherwise), information about that search can be recorded and associated with the user. By analyzing patterns in a given user's queries, a "user vector"

may be developed. During a contextual search, information from the user vector as well as the context vector may be used in performing the search and/or ranking the results. In addition, the user vector may also be used in dynamically generating augmented content when a user activates a contextual search interface as described above. Where the user who entered a query is identifiable, any user-specific information (e.g., sites or pages a user has bookmarked, explicit user ratings of sites or pages, and so on) may also be used in conjunction with a context vector to inform search results.

In even further embodiments, users may be able to create bookmarks for contextual search interfaces (or specific contextual queries) that they have found useful so that they can easily return to these interfaces. It will be appreciated that because contextual search interfaces return context-dependent results, not all such interfaces are likely to be equally useful to a particular user. When a user finds one that is useful, she may bookmark the page that contains it using conventional browser-based bookmarks or bookmarking functionality supported by a search toolbar; however, it will be appreciated that if the content of the hosting page changes, the context vector may change as well. Accordingly, some embodiments of the present invention enable the user to bookmark the contextual search itself, e.g., by saving the enhanced query URL that includes the context vector. When the user selects this bookmark, she is prompted to enter a query, and a contextual search is executed, using the new query. Alternatively, the user may be able to save the query as part of the bookmark so that selecting the bookmark at some later time re-executes a particular contextual search regardless of the current content of the hosting page.

Users may also be able to share their bookmarked contextual searches with other users, e.g., through various trust network mechanisms. In still other embodiments, users may be able to annotate and label their bookmarked (or otherwise saved) contextual searches or interfaces.

While the invention has been described with respect to specific embodiments, one skilled in the art will recognize that numerous modifications are possible. For instance, where specific input devices (e.g., computer mouse) are referred to herein, it is to be understood that different input devices (e.g., keystrokes or voice commands) can be substituted. Similarly, clickable buttons and other graphical user interface control elements referred to herein may be replaced by any suitable alternative control elements.

The appearance of the contextual search interface in active and/or inactive states may also vary from that shown herein. For instance, the active interface may appear in the hosting page as shown in FIG. 3 or in a separate pop-up window. In addition, the look of the icon and/or the active interface elements may be varied. Such variation may be controlled by a contextual search promulgator or a content provider. As just one example, the look of the inactive icon may be varied to suggest the context; thus, a film reel might be included in an icon for entertainment-related searches, a football or baseball might be included in icons for sports-related searches, and so on. A consistent text string (e.g., "Search This" as shown in FIG. 6) or other element may be included in the icon as a further indication that the icon represents a contextual search interface.

In another variation, the inactive state of a contextual search icon may be implemented with hidden and visible modes. For example, the contextual search icon may be hidden (i.e., not displayed on the hosting page) except when the user's mouse cursor is positioned or moved over the associated content. When the mouse cursor is so positioned, the icon becomes visible and the user may click on it to activate it. Hidden and visible modes may be implemented, e.g., using a language such as Java.

The embodiments described herein may make reference to Web sites pages, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found.

In addition, the invention has been described with reference to computer systems having particular hardware and software elements. It is to be understood that other systems with different combinations of hardware and/or software components could also be implemented.

Thus, although the invention has been described with respect to specific embodiments, it will be appreciated that the invention is intended to cover all modifications and equivalents within the scope of the following claims.

What is claimed is:

1. A method for processing a query, the method comprising the computer-implemented steps of:
   providing to a client a page comprising content to be presented to a user, wherein said page includes code that, when executed by the client, causes the client to perform the steps of:
      associating, with a first portion of the content in said page, a first contextual search interface adapted to accept a query from the user;
      associating, with a second portion of the content in said page, a second contextual search interface adapted to accept a query from the user;
      associating with the first contextual search interface a first context vector derived from the first portion of the content;
      associating with the second contextual search interface a second context vector derived from the second portion of the content;
      wherein the first portion of the content in the page is different than the second portion of the content in the page;
      wherein the first contextual search interface is different than the second contextual search interface;
      wherein the first context vector is different than the second context vector;
      while displaying the first portion of the content and the first contextual search interface in the page, receiving a query from the user via the first contextual search interface; and
      transmitting the query with the first context vector to a search server for processing, wherein the search server is a server that is configured to (a) generate a search result using at least the query, the first context vector, and a plurality of hits obtained from searching a search corpus, and (b) return the search result to the user;
   wherein the method is performed by one or more computing devices.

2. The method of claim 1, wherein the context vector includes a first term extracted from the first portion of content.

3. The method of claim 1, wherein said code includes or references code that includes instructions for:
   transmitting to the search engine a user vector associated with the user who entered the user query, said user vector being different than said user query and said first context vector, wherein said user vector includes data identifying characteristics of the user, wherein the search server is further configured to generate the search result using the user vector.

4. The method of claim 1, wherein said code includes or references code that includes instructions for:

defining an inactive state and an active state for the first contextual search interface, wherein the code, when the page is displayed by said client, further causes the client to display the first contextual search interface as an icon when in the inactive state and as an operable interface when in the active state.

5. The method of claim 4, wherein the operable interface includes a text field configured for entry of text by a user and a submit control configured for submitting query text entered by the user, wherein the query text is submitted in association with the first context vector.

6. The method of claim 4, wherein the code, when executed by the client, further causes the client to perform the steps of:

displaying the first contextual search interface in the inactive state by default; and redisplaying the first contextual search interface in the active state in response to user selection of the icon.

7. The method of claim 6, wherein the code, when executed by the client, further causes the client to perform the step of, in response to user selection of the icon, adding special content to the page, wherein the special content is selected based on the context vector.

8. The method of claim 7, wherein the special content includes one or more of: (1) a link to another page; (2) advertizing content; or (3) a listing of related queries based on one or more previous queries received via the first contextual search interface.

9. The method of claim 1, wherein one or both of the steps of associating a first contextual search interface with the first portion of the content and associating a first context vector with the first contextual search interface are performed in response to a user command.

10. The method of claim 1, wherein the code in said page includes or references code that causes one or both of associating the first contextual search interface with the first portion of the content and associating the first context vector with the first contextual search interface.

11. A method for providing contextually-based searching the method comprising the computer-implemented steps of:

providing a page comprising: (a) a first portion of content to be displayed to a user, (b) a second portion of content to be displayed to the user, (c) a first contextual search interface, associated with the first portion of content, that is adapted to accept a query from the user, and (c) a second contextual search interface, associated with the second portion of content, adapted to accept a query from the user;

wherein the first portion of content is different than the second portion of content and the first contextual search interface is separate from the second contextual search interface;

associating with the first contextual search interface a first context vector derived from the first portion of the content;

associating with the second contextual search interface a second context vector derived from the second portion of the content, wherein the second context vector is different from the first context vector;

wherein the first contextual search interface is configured to, in response to a user submitting a query via the first contextual search interface, submit the query and the first context vector to a search engine; and wherein the second contextual search interface is configured to, in response to a user submitting a query via the second contextual search interface, submit the query and the second context vector to a search engine;

wherein the method is performed by one or more computing devices.

12. A method for creating a search interface, the method comprising the computer-implemented steps of:

receiving a first portion of page content from a client;

tokenizing the received first portion of page content to identify one or more tokens representative of the first portion of page content;

generating a first context vector from the received first portion of page content based on the identified one or more tokens;

creating a first contextual search code block, the first contextual search code block including the first context vector, the first contextual search code block further including first display code for displaying a first contextual search interface and first query code for submitting a user query entered via the first contextual search interface to a search server together with the first context vector; and returning the first contextual search code block to the client in response to receiving the first portion of the page content;

receiving a second portion of page content from a client, wherein the second portion is different than the first portion;

tokenizing the received second portion of page content to identify one or more tokens representative of the second portion of page content;

generating a second context vector from the received second portion of page content based on the identified one or more tokens, wherein the second context vector is different than the first context vector;

creating a second contextual search code block, the second contextual search code block including the second context vector, the second contextual search code block further including second display code for displaying a second contextual search interface and second query code for submitting a user query entered via the second contextual search interface to the search server together with the second context vector, wherein the second contextual search interface is separate from the first contextual search interface; and returning the second contextual search code block to the client in response to receiving the second portion of the page content;

wherein the method is performed by one or more computing devices.

13. The method of claim 12, wherein the first contextual search code block and the second contextual search code block are adapted for insertion as an element of a hosting page, wherein the hosting page comprises the received first portion of page content and the received second portion of page content.

14. The method of claim 12, wherein the first contextual search code block is adapted for displaying in a separate window.

15. The method of claim 12, wherein the client includes a user application module that enables a user to select the first portion of page content and the second portion of page content while viewing a page.

16. The method of claim 15, wherein the page is a Web page or a document.

17. The method of claim 12, wherein the client includes a content developer module that enables a content developer to select the first portion of page content and the second portion of page content while editing a page.

18. The method of claim 12, wherein the first contextual search interface includes a text field for entering a query and a submit button for submitting the query to a search server.

19. The method of claim 12, wherein the first contextual search code block further includes code for defining an inactive state and an active state for the first contextual search interface, wherein the first contextual search interface appears as an icon when in the inactive state and as an operable interface when in the active state.

20. The method of claim 12, wherein the step of generating the first context vector further includes:
determining a token frequency for at least a particular token of the identified one or more tokens; and
including the token frequency in the first context vector in association with the particular token.

21. The method of claim 12, wherein the step of generating the first context vector further includes:
determining a document frequency for at least a particular token of the identified one or more tokens in a search corpus; and
including the document frequency in the first context vector in association with the particular token.

22. The method of claim 1, wherein:
the code includes or references code that includes code for displaying the first contextual search interface; and
the code includes or references code that includes a representation of the first context vector.

23. One or more computer-readable storage media storing one or more sequences of instructions which, when executed by one or more processors, causes the one or more processors to perform the method recited in claim 1.

24. One or more computer-readable storage media storing one or more sequences of instructions which, when executed by one or more processors, causes the one or more processors to perform the method recited in claim 11.

25. One or more computer-readable storage media storing one or more sequences of instructions which, when executed by one or more processors, causes the one or more processors to perform the method recited in claim 12.

26. The method of claim 1, wherein the code, when executed by the client, causes said client to display the first contextual search interface within said page, adjacent to said content.

27. The method of claim 12,
wherein the page content received from the client is page content that the client provides over a network to a user in a particular web page;
wherein the contextual search code block is a code block that may be inserted into the particular web page in association with the page content.

28. A method comprising:
a web developer causing page content from a web page to be submitted to a context processing module;
in response to the submitted page content, the context processing module generating and returning a code block based on the submitted page content;
wherein the code block includes a context vector derived by the contextual search utility from the page content;
the web developer causing the code block to be inserted into the web page in association with the page content;
a web client interpreting the web page, and, based on said interpreting: (1) displaying at least the page content, and (2) displaying a contextual search interface based upon the code block;
in response to user input received via the contextual search interface while displaying at least the page content, based on the code block, the web client sending the context vector and a query entered by the user to a search engine;
the search engine executing a search based upon the query and the context vector; and
the search engine returning search results for the search to the web client for display to the user;
wherein at least the steps of generating the code block, interpreting the web page, executing the search, and returning search results are performed by one or more computing devices.

29. A method comprising:
associating, with a first portion of content in a page, a first contextual search interface adapted to accept a query from the user;
associating, with a second portion of content in said page, a second contextual search interface adapted to accept a query from the user;
associating with the first contextual search interface a first context vector derived from the first portion of content;
associating with the second contextual search interface a second context vector derived from the second portion of content;
wherein the first context vector is different than the second context vector;
wherein the first portion of content in the page is different than the second portion of content in the page;
while displaying the first portion of content and the first contextual search interface, receiving a first query from the user via the first contextual search interface; and
while displaying the second portion of content and the second contextual search interface, receiving a second query from the user via the second contextual search interface; and
transmitting the first query with the first context vector to a search server for processing; and
transmitting the second query with the second context vector to a search server for processing;
wherein the search server is a server that is configured to (a) generate a search result using at least a query, a context vector, and a plurality of hits obtained from searching a search corpus, and (b) return the search result to the user;
wherein the method is performed by one or more computing devices.

30. The method of claim 29, further comprising generating the first context vector based on tokenizing the first portion of content.

31. The method of claim 29, further comprising displaying the first contextual search interface in a toolbar or pop-up window, wherein the method is performed by one or both of a web browser or a browser plug-in.

32. The method of claim 29, wherein associating the first contextual search interface with the first portion of content is performed responsive, in part, to the user highlighting the first portion of content.

33. The method of claim 29, wherein associating the first contextual search interface with the first portion of content is performed based on content that is displayed when the user enters text in the first contextual search interface.

34. The method of claim 1, wherein the page is a web page, wherein the code includes one or both of HTML and JavaScript.

35. The method of claim 11, further comprising generating the first context vector by tokenizing the first portion of content and generating the second context vector by tokenizing the second portion of content.

36. The method of claim 11,
wherein first contextual search interface is initially displayed in an inactive state, in which a query box is not displayed;
wherein the page further comprises a control adjacent to the first portion of content for causing the first contextual search interface to be displayed in an active state, in which a query box is displayed.

37. One or more computer-readable storage media storing one or more sequences of instructions which, when executed by one or more processors, causes the one or more processors to perform the method recited in claim 2.

38. One or more computer-readable storage media storing one or more sequences of instructions which, when executed by one or more processors, causes the one or more processors to perform the method recited in claim 3.

39. One or more computer-readable storage media storing one or more sequences of instructions which, when executed by one or more processors, causes the one or more processors to perform the method recited in claim 4.

40. One or more computer-readable storage media storing one or more sequences of instructions which, when executed by one or more processors, causes the one or more processors to perform the method recited in claim 5.

41. One or more computer-readable storage media storing one or more sequences of instructions which, when executed by one or more processors, causes the one or more processors to perform the method recited in claim 6.

42. One or more computer-readable storage media storing one or more sequences of instructions which, when executed by one or more processors, causes the one or more processors to perform the method recited in claim 7.

43. One or more computer-readable storage media storing one or more sequences of instructions which, when executed by one or more processors, causes the one or more processors to perform the method recited in claim 8.

44. One or more computer-readable storage media storing one or more sequences of instructions which, when executed by one or more processors, causes the one or more processors to perform the method recited in claim 9.

45. One or more computer-readable storage media storing one or more sequences of instructions which, when executed by one or more processors, causes the one or more processors to perform the method recited in claim 10.

46. One or more computer-readable storage media storing one or more sequences of instructions which, when executed by one or more processors, causes the one or more processors to perform the method recited in claim 13.

47. One or more computer-readable storage media storing one or more sequences of instructions which, when executed by one or more processors, causes the one or more processors to perform the method recited in claim 14.

48. One or more computer-readable storage media storing one or more sequences of instructions which, when executed by one or more processors, causes the one or more processors to perform the method recited in claim 15.

49. One or more computer-readable storage media storing one or more sequences of instructions which, when executed by one or more processors, causes the one or more processors to perform the method recited in claim 16.

50. One or more computer-readable storage media storing one or more sequences of instructions which, when executed by one or more processors, causes the one or more processors to perform the method recited in claim 17.

51. One or more computer-readable storage media storing one or more sequences of instructions which, when executed by one or more processors, causes the one or more processors to perform the method recited in claim 18.

52. One or more computer-readable storage media storing one or more sequences of instructions which, when executed by one or more processors, causes the one or more processors to perform the method recited in claim 19.

53. One or more computer-readable storage media storing one or more sequences of instructions which, when executed by one or more processors, causes the one or more processors to perform the method recited in claim 20.

54. One or more computer-readable storage media storing one or more sequences of instructions which, when executed by one or more processors, causes the one or more processors to perform the method recited in claim 21.

55. One or more computer-readable storage media storing one or more sequences of instructions which, when executed by one or more processors, causes the one or more processors to perform the method recited in claim 22.

56. One or more computer-readable storage media storing one or more sequences of instructions which, when executed by one or more processors, causes the one or more processors to perform the method recited in claim 26.

57. One or more computer-readable storage media storing one or more sequences of instructions which, when executed by one or more processors, causes the one or more processors to perform the method recited in claim 27.

58. One or more computer-readable storage media storing one or more sequences of instructions which, when executed by one or more processors, causes the one or more processors to perform the method recited in claim 28.

59. One or more computer-readable storage media storing one or more sequences of instructions which, when executed by one or more processors, causes the one or more processors to perform the method recited in claim 29.

60. One or more computer-readable storage media storing one or more sequences of instructions which, when executed by one or more processors, causes the one or more processors to perform the method recited in claim 30.

61. One or more computer-readable storage media storing one or more sequences of instructions which, when executed by one or more processors, causes the one or more processors to perform the method recited in claim 31.

62. One or more computer-readable storage media storing one or more sequences of instructions which, when executed by one or more processors, causes the one or more processors to perform the method recited in claim 32.

63. One or more computer-readable storage media storing one or more sequences of instructions which, when executed by one or more processors, causes the one or more processors to perform the method recited in claim 33.

64. One or more computer-readable storage media storing one or more sequences of instructions which, when executed by one or more processors, causes the one or more processors to perform the method recited in claim 34.

65. One or more computer-readable storage media storing one or more sequences of instructions which, when executed by one or more processors, causes the one or more processors to perform the method recited in claim 35.

66. One or more computer-readable storage media storing one or more sequences of instructions which, when executed by one or more processors, causes the one or more processors to perform the method recited in claim 36.

* * * * *